US010439273B1

(12) United States Patent
Greenbaum et al.

(10) Patent No.: US 10,439,273 B1
(45) Date of Patent: Oct. 8, 2019

(54) SPACE-BASED TETHERED COMMUNICATION ANTENNA ARRAY

(71) Applicant: The Charles Stark Draper Laboratory, Inc., Cambridge, MA (US)

(72) Inventors: Adam J. Greenbaum, Brookline, MA (US); Bradley A. Moran, Concord, MA (US); Robert D. Tingley, Waltham, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 16/439,302

(22) Filed: Jun. 12, 2019

Related U.S. Application Data

(62) Division of application No. 15/227,446, filed on Aug. 3, 2016.

(60) Provisional application No. 62/206,644, filed on Aug. 18, 2015.

(51) Int. Cl.

| | |
|---|---|
| ***H01Q 1/28*** | (2006.01) |
| ***H01Q 3/24*** | (2006.01) |
| ***H01Q 21/22*** | (2006.01) |
| ***H04B 1/40*** | (2015.01) |

(52) U.S. Cl.
CPC ............... *H01Q 1/288* (2013.01); *H01Q 3/24* (2013.01); *H01Q 21/22* (2013.01); *H04B 1/40* (2013.01)

(58) Field of Classification Search
CPC ............ H01Q 1/288; H01Q 1/30; H01Q 3/24; H01Q 3/26; H01Q 3/30; H01Q 3/34; H01Q 21/22
See application file for complete search history.

(56) References Cited

U.S. PATENT DOCUMENTS 3,324,470 A 6/1967 Morse

OTHER PUBLICATIONS

Claudin, et al., "A Concept of Deployable Tethered Interferometer," Proceedings of the ESA Colloquium on Targets for Space-based Interferometry, pp. 241-245, Oct. 1992.
Energy Projects, "Electrodynamic Tether," http://www.thelivingmoon.com/41pegasus/02files/Electrodynamic.html, 20 pages, 2006.
Hansen, "Phased Array Antennas," Second Edition, John Wiley & Sons, Inc., pp. 193-194, 2009.

(Continued)

*Primary Examiner* — Robert Karacsony
(74) *Attorney, Agent, or Firm* — Sunstein Kann Murphy & Timbers LLP

(57) ABSTRACT

A space-based phased antenna array provides one- or two-dimensional beam steering, yet is compact upon launch and does not require gravity to maintain its shape or orientation. An exemplary antenna array includes a central satellite and at least three peripheral satellites. Each peripheral satellite is mechanically connected to the central satellite by an extendible tether. At launch, the tethers are retracted, so the peripheral satellites are close to, or within, the central satellite. Once in position, the central satellite rotates and extends the tethers, thereby deploying the peripheral satellites in a planar radial pattern. Multiple antenna elements, some disposed on each tether, collectively form a planar phased array that can be electronically beam steered in two dimensions. The antenna array may relay signals, such as between local companion satellites or planet-based stations, and earth. Linear versions, with as few as two tethered satellites, are beam steerable in one dimension.

29 Claims, 20 Drawing Sheets

(56) References Cited

OTHER PUBLICATIONS

Lorenzini, "Participation in the Analysis of the Far-Infrared/Submillimeter Interferometer," Annual Report #1, NASA Grant NNG04GQ21G, 35 pages, Jul. 2005.
Sabbadini, "Antenna design for Space Applications," European Space Agency, 53 pages, 2009.
Kramer, "STARS-2 (Space Tethered Autonomous Robotic Satellite-2)," https://directory.eoportal.org/web/eoportal/satellite-missions/s/stars-2, 6 pages, 2014.
Tan, et al., "Tethered Satellite Constellations in Auroral Observation Missions," AIAA/AAS Astrodynamics Specialist Conference and Exhibit, 9 pages, Aug. 2002.
Tomlinson, et al., "Space-Based Tethered Array Radar (STAR)—A Distributed Small Satellite Network," Small Satellite Conference, 15 pages, 1988.
Anonymous, "TSATT, Tethered SATellite Testbed," Student Space Systems Fabrication Laboratory, University of Michigan, http://claspresearch.engin.umich.edu/groups/s3fl/tsatt.php, 2 pages, 2009.
Wikipedia, "Beam Steering," https://en.wikipedia.org/w/index.php?title=Beam_steering&oldid=617681689, 2 pages, Jul. 20, 2014.
Wikipedia, "Electrodynamic tether," https://en.wikipedia.org/w/index.php?title=Electrodynamic_tether&oldid=660986492, 19 pages, May 5, 2015.

SPACE-BASED TETHERED COMMUNICATION ANTENNA ARRAY

CROSS-REFERENCE TO RELATED APPLICATIONS

This application is a divisional of U.S. patent application Ser. No. 15/227,446, filed Aug. 3, 2016, titled "Space-Based Tethered Communications Antenna Array," which claims the benefit of U.S. Provisional Pat. Appl. No. 62/206,644, filed Aug. 18, 2015, titled "Tethered Antenna Array for Space-to-Ground and Space-to-Space Communications Links," the entire contents of each of which are hereby incorporated by reference herein, for all purposes.

TECHNICAL FIELD

The present invention relates to antennas and, more particularly, to phased arrays of antenna elements tethered to satellites and spun in outer space.

BACKGROUND ART

Phased arrays of antenna elements are commonly used in radar and other applications in which a direction of an incoming radio frequency (RF) signal needs to be ascertained or in which an RF signal needs to be transmitted in a particular direction. One or more receivers, transmitters or transceivers are electrically connected to an array of antenna elements via feed lines, such as waveguides or coaxial cables. Taking a transmitter case as an example, the transmitter(s) operate such that the phase of the signal at each antenna element is separately controlled. Signals radiated by the various antenna elements constructively and destructively interfere with each other in the space in front of the antenna array. In directions where the signals constructively interfere, the signals are reinforced, whereas in directions where the signals destructively interfere, the signals are suppressed, thereby creating an effective radiation pattern of the entire array that favors a desired direction. The phases at the various antenna elements, and therefore the direction in which the signal propagates, can be changed very quickly, thereby enabling such a system to be electronically steered, for example to sweep over a range of directions.

According to the reciprocity theorem, a phased array of antenna elements can be used to receive signals preferentially from a desired direction. By electronically changing the phasing, a system can sweep over a range of directions to ascertain a direction from which a signal originates, i.e., a direction from which the signal's strength is maximum, or to electronically steer a phased array toward a transmitting antenna and away from interference (noise) sources.

Phased arrays are physically large, relative to wavelengths of signals transmitted and/or received by the arrays. Many phased arrays are also massive. Consequently, launching phased arrays into outer space, or constructing such arrays in space, is difficult or impossible with current launch vehicles and space construction techniques.

SUMMARY OF EMBODIMENTS

An embodiment of the present invention provides an antenna array. The antenna array includes a central hub and at least three flexible extendible tethers attached to the central hub. The antenna array also includes at least three peripheral satellites. Each peripheral satellite is attached to the central hub by a respective associated one of the tethers.

The antenna array has a first mode and a second mode. In the first mode, each tether is retracted, such that the peripheral satellite associated with the tether is disposed within about 2 meters of the central hub.

In the second mode, the central hub is configured to rotate about an axis. Also in the second mode, the tethers are extended, thereby deploying the peripheral satellites radially away from the central hub a distance greater than about 2 meters. The peripheral satellites orbit the central hub in a plane perpendicular to the axis. Each tether is taut.

The antenna array also includes a plurality of antenna elements. The antenna elements are disposed along the tethers. At least two antenna elements are disposed along each tether. A phaser is coupled to the plurality of antenna elements to beam-steer a lobe of a radiation pattern of the plurality of antenna elements in two dimensions.

In some embodiments, in the first mode, each tether is retracted, such that the peripheral satellite associated with the tether is proximate the central hub, and in the second mode, the tethers are extended, thereby deploying the peripheral satellites radially away from the central hub.

In some embodiments, in the first mode, each tether is retracted, such that the peripheral satellite associated with the tether is disposed less than a first predetermined distance (such as about 0.5, 1, 2, 3 or 4 meters) of the central hub, and in the second mode, the tethers are extended, thereby deploying the peripheral satellites radially away from the central hub at least a second predetermined distance (such as about 0.5, 1, 2, 3 or 4 meters).

In the second mode, centripetal forces, caused by orbiting of the peripheral satellites about the central hub, may extend and tension the tethers.

The phaser may be configured to alter phasing of the plurality of antenna elements in synchrony with rotation of the central hub.

The antenna array may also include a second antenna and a radio-frequency receiver. The radio-frequency receiver may have an input coupled to the second antenna. The radio-frequency receiver may also have an output. The antenna array may also include a radio-frequency transmitter. The radio-frequency transmitter may have an input coupled to the output of the radio-frequency receiver. The radio-frequency transmitter may have an output coupled to the phaser. The radio-frequency receiver may be configured to receive signals, via the second antenna, and the transmitter may be configured to relay the signals, via the plurality of antenna elements.

The antenna array may also include a second antenna and a radio-frequency transceiver. The radio-frequency transceiver may be coupled to the second antenna and to the phaser. The radio-frequency transceiver may be configured to receive first signals, via the second antenna, and relay the first signals, via the plurality of antenna elements.

The transceiver may be further configured to receive second signals, via the plurality of antenna elements, and relay the second signals, via the second antenna.

The central hub may include at least one spool configured to extend the at least three tethers.

Each peripheral satellite may include a respective spool configured to extend the tether associated with the peripheral satellite.

Another embodiment of the present invention provides an antenna array. The antenna array includes a central hub rotating about an axis and at least three tethers attached to the central hub. The at least three tethers extend radially away from the central hub. The antenna array also includes at least three peripheral satellites. Each peripheral satellite is spaced apart from the central hub by at least about 2 meters. Each peripheral satellite is attached to the central hub by a respective one of the tethers. The respective one of the tethers is taut. Each peripheral satellite orbits the central hub in a plane perpendicular to the axis.

The antenna array also includes a plurality of antenna elements. The antenna elements are disposed along the tethers. At least two antenna elements are disposed along each tether. A phaser is coupled to the plurality of antenna elements to beam-steer a lobe of a radiation pattern of the plurality of antenna elements in two dimensions.

Centripetal forces, caused by orbiting of the peripheral satellites about the central hub, may extend and tension the tethers.

The phaser may be configured to alter phasing of the plurality of antenna elements in synchrony with rotation of the central hub.

The antenna array may also include a second antenna and a radio-frequency receiver having an input coupled to the second antenna. The radio-frequency receiver may have an output. The antenna array may also include a radio-frequency transmitter having an input coupled to the output of the receiver. The radio-frequency transmitter may have an output coupled to the phaser. The receiver may be configured to receive signals, via the second antenna, and the transmitter may be configured to relay the signals, via the plurality of antenna elements.

The antenna array may also include a second antenna and a radio-frequency transceiver coupled to the second antenna and to the phaser. The transceiver may be configured to receive first signals, via the second antenna, and relay the first signals, via the plurality of antenna elements.

The transceiver may be further configured to receive second signals, via the plurality of antenna elements, and relay the second signals, via the second antenna.

Yet another embodiment of the present invention provides a method for receiving or transmitting radio-frequency signals in outer space. The method includes providing a central hub in outer space and rotating the central hub about an axis. At least three flexible tethers are extended radially from the central hub. A respective peripheral satellite is attached to each of the tethers. Extending the tethers thereby deploys the peripheral satellites radially away from the central hub. The peripheral satellites orbit the central hub in a plane perpendicular to the axis. Each tether is taut between the central hub and the respective peripheral satellite. Each tether has at least two antenna elements disposed on it. The antenna elements of all the tethers collectively form an antenna array. Signals delivered to, or received from, the antenna array are phase adjusted to beam-steer a lobe of a radiation pattern of the antenna array in two dimensions.

Extending the at least three flexible tethers radially from the central hub may include using centripetal forces to extend and tension the tethers. The centripetal forces may be caused by orbiting of the peripheral satellites about the central hub.

Phasing of the plurality of antenna elements may be altered in synchrony with rotation of the central satellite.

A second antenna and a radio-frequency receiver may be provided. The second antenna and the radio-frequency receiver may be mechanically coupled to the central hub. An input of the radio-frequency receiver may be communicatively coupled to the second antenna. A radio-frequency transmitter may be provided. The radio-frequency transmitter may be mechanically coupled to the central hub. An input of the transmitter may be communicatively coupled to an output of the receiver. An output of the transmitter may be communicatively coupled to the antenna array. A signal may be received via the second antenna and the receiver. The signal may be relayed via the transmitter and the antenna array.

A second antenna and a radio-frequency transceiver may be provided. The second antenna and the radio-frequency transceiver may be mechanically coupled to the central hub. The radio-frequency transceiver may be communicatively coupled to the second antenna and to the antenna array. First signals may be received via the second antenna and the transceiver. The first signals may be relayed via the transceiver and the antenna array.

Second signals may be received via the antenna array and the transceiver. The second signal may be relayed via the transceiver and the second antenna.

Extending the at least three flexible tethers may include paying out the at least three flexible tethers from the central hub.

For each of the at least three tethers, extending the tether may include paying out a respective one of the at least three flexible tethers from the peripheral satellite attached to the tether.

An embodiment of the present invention provides a non-transitory computer-readable medium. The medium is encoded with instructions. When executed by a processor, the instructions establish processes for performing a computer-implemented method of receiving radio-frequency signals in outer space. The processes include a process configured to rotate a central hub about an axis. A process is configured to extend at least three flexible tethers radially from the central hub. A respective peripheral satellite is attached to each of the tethers. Extending the tethers thereby deploys the peripheral satellites radially away from the central hub. The peripheral satellites orbit the central hub in a plane perpendicular to the axis. Each tether is taut between the central hub and the respective peripheral satellite. Each tether has at least two antenna elements disposed on it. The antenna elements of all the tethers collectively form an antenna array. A process is configured to phase adjust signals delivered to, or received from, the antenna array to beam-steer a lobe of a radiation pattern of the antenna array in two dimensions.

The process configured to extend the tethers may be configured to extend and tension the tethers using centripetal forces caused by orbiting of the peripheral satellites about the central hub.

The processes may include a process configured to alter phasing of the plurality of antenna elements in synchrony with rotation of the central hub.

A second antenna and a radio-frequency receiver may be mechanically coupled to the central hub. An input of the receiver may be communicatively coupled to the second antenna. An input of the radio-frequency transmitter may be communicatively coupled to an output of the receiver. An output of the transmitter may be communicatively coupled to the antenna array.

A process may be configured to receive a signal via the second antenna and the receiver. A process may be configured to relay the signal via the transmitter and the antenna array.

A second antenna and a radio-frequency transceiver may be mechanically coupled to the central hub. The radio-frequency transceiver may be communicatively coupled to the second antenna and to the antenna array. A process may be configured to receive first signals, via the second antenna and the transceiver. A process may be configured to relay the first signals via the transceiver and the antenna array.

A process may be configured to receive second signals via the antenna array and the transceiver. A process may be configured to relay the second signal via the transceiver and the second antenna.

Another embodiment of the present invention provides an antenna array. The antenna array includes a first satellite and a flexible extendible tether. The antenna array also includes a second satellite attached to the first satellite by the extendible tether. The antenna array has a first mode and a second mode.

In the first mode, the tether is retracted, i.e., the first satellite is disposed within about 2 meters of the second satellite.

In the second mode, the first and second satellites are configured to rotate about an axis and extend the tether. Extending the tether deploys the first and second satellites radially away from each other a distance greater than about 2 meters. The first and second satellites orbit in a plane perpendicular to the axis. While the first and second satellites orbit, the tether is taut.

A plurality of antenna elements is disposed along the tether. A phaser is coupled to the plurality of antenna elements to beam-steer a lobe of a radiation pattern of the plurality of antenna elements.

In some embodiments, in the first mode, the tether is retracted, such that the first satellite is disposed less than a first predetermined distance (such as about 0.5, 1, 2, 3 or 4 meters) of the second satellite, and in the second mode, the tether is extended, thereby deploying the first and second satellites radially away from each other at least a second predetermined distance (such as about 0.5, 1, 2, 3 or 4 meters).

BRIEF DESCRIPTION OF THE SEVERAL VIEWS OF THE DRAWINGS

Embodiments of the invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for space-based phased antenna arrays that provide two-dimensional beam steering, yet are compact upon launch and do not rely on gravity to maintain their shapes. An exemplary antenna array includes a central satellite and at least three peripheral satellites. Each peripheral satellite is mechanically connected to the central satellite by an extendible tether. At launch, the tethers are retracted, i.e., not extended, so the peripheral satellites are close to, or even within, the central satellite. However, once the antenna array is inserted into orbit or another desired trajectory, the central satellite rotates and extends the tethers, thereby deploying the peripheral satellites in a planar radial pattern. Multiple antenna elements are disposed on each tether, and collectively all the antenna elements form a planar phased array that can be electronically beam steered in two dimensions.

In some alternative embodiments, each peripheral satellite pays out its own tether, rather than the central satellite paying out all the tethers. Some embodiments omit the central satellite and, instead, merely bind together central ends of the tethers. In some embodiments, the peripheral satellites are equipped with thrusters and use the thrusters to reposition themselves to reorient the antenna array, without necessarily retracting the tethers. Yet other embodiments include only two tethered satellites in each array, thereby providing spinning one-dimensional (linear) phased antenna arrays that can be beam steered in one dimension.

Figure 1:
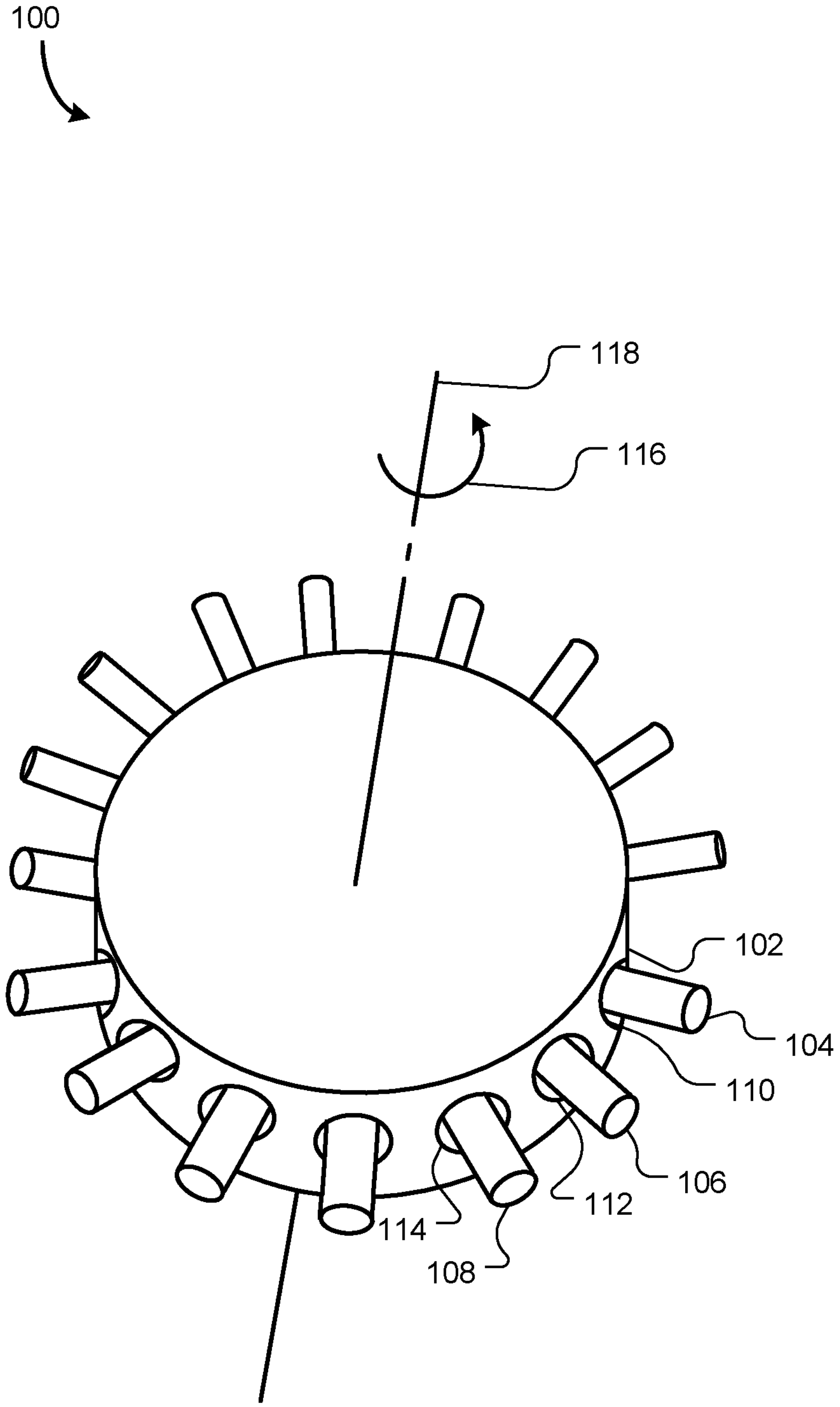
FIG. 1 is a schematic perspective view of an antenna array, according to an embodiment of the present invention.

FIG. 1 is a schematic perspective view of an antenna array 100, according to an embodiment of the present invention. The antenna array 100 includes a central satellite 102 (also referred to herein as a "central hub") and at least three peripheral satellites, represented by peripheral satellites 104, 106 and 108. Although ten peripheral satellites 104-108 are shown in the embodiment of FIG. 1, other numbers, larger or smaller than ten, of peripheral satellites 104-108 may be used.

At launch, the antenna array 100 should be compact, so as to fit within a payload compartment of a launch vehicle. Currently, the largest available launch vehicles have launch fairings on the order of 5 or 6 meters in diameter, limiting the size of payload objects to this size. The antenna array 100 has two modes: a compact mode and a fully deployed mode. FIG. 1 shows the antenna array 100 in the compact mode. In the compact mode, the peripheral satellites 104-108 are close to the central satellite 102. In the embodiment of FIG. 1, each peripheral satellite 104-108 is at least partially disposed within a corresponding recess, represented by recesses 110, 112 and 114, in the central satellite 102.

Figure 2:
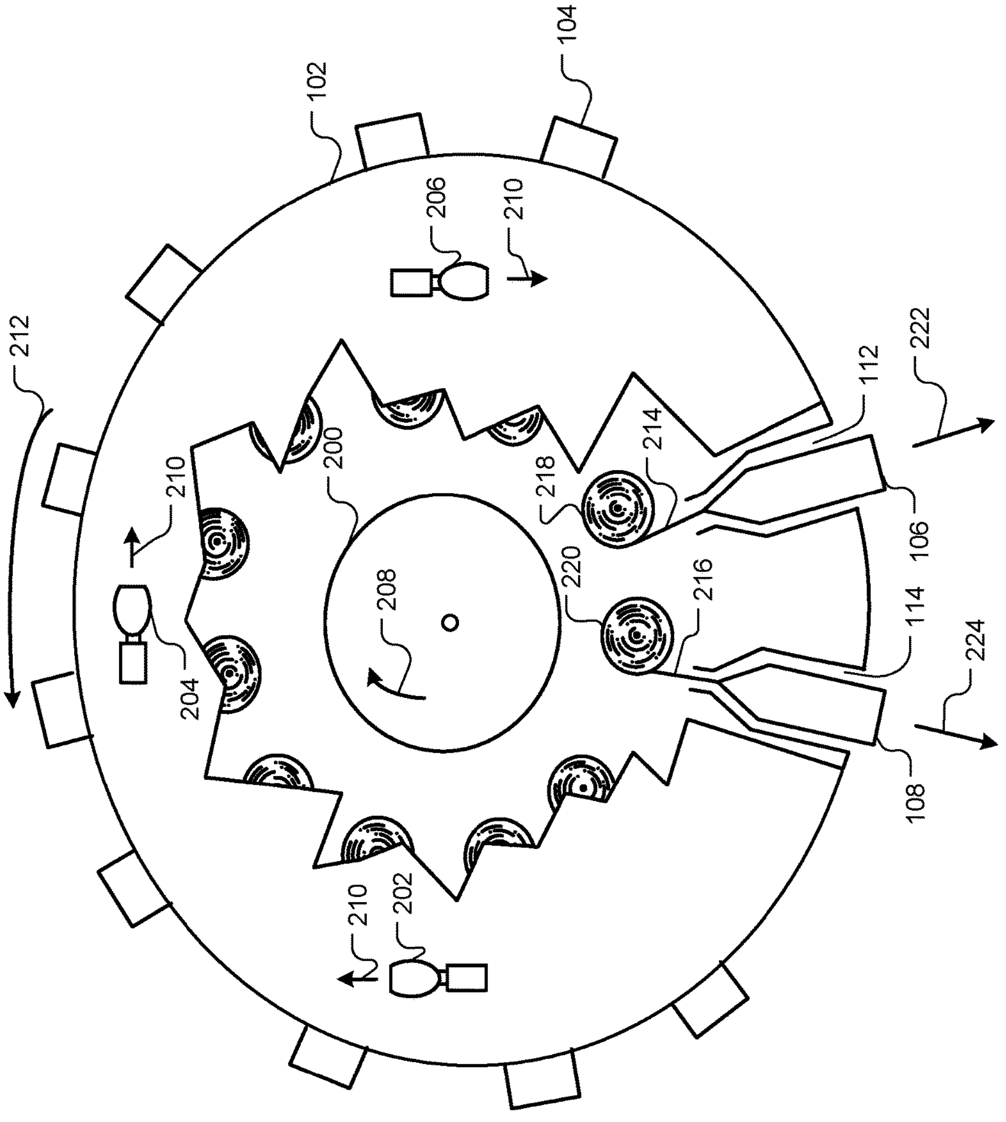
FIG. 2 is a schematic cut-away top view of the antenna array of FIG. 1 in a compact mode, according to an embodiment of the present invention.

Once the antenna array 100 is inserted into orbit or another desired trajectory, the central satellite 102 rotates, as indicated by arrow 116, about an axis 118. FIG. 2 is a schematic cut-away top view of the antenna array 100 in the compact mode. The central satellite 102 may include a reaction wheel 200, thrusters, represented by thrusters 202, 204 and 206, or any other suitable station-keeping device. Turning the reaction wheel 200 as indicated by arrow 208, or firing the thrusters 202-206 as represented by arrows 210, causes the central satellite 102 to rotate, as indicated by arrow 212. Alternatively, the launch vehicle can impart the rotation 212 when the antenna array 100 is ejected from the payload compartment (not shown). Other well-known methods may be used to initiate the rotation 212 of the central satellite 102.

As noted, in the compact mode, the peripheral satellites 104-108 are close to the central satellite 102, such as within 2 or 3 meters of the central satellite 102. Each peripheral satellite 104-108 is mechanically coupled to the central satellite 102 by a respective flexible tether, represented by flexible tethers 214 and 216. In the first mode, the tethers 214-216 are wound on respective spools, represented by spools 218 and 220. However, once the central satellite 102 begins to rotate 212, centripetal forces urge the peripheral satellites 104-108 radially away from the central satellite 102, as represented by arrows 222 and 224.

"Flexible" here means the tethers 214-216 can bend laterally sufficiently to be wound on the spools 218-220, without appreciable damage to the tethers 218-220, by forces generated by the spools 218-220 and respective motors (not shown) that drive the spools. However, the tethers 214-216 should have limited longitudinal stretchability, to maintain total length in use, and length between antenna elements, so as to maintain phase relationships among the antenna elements. The tethers 214-216 may be made of, or include, a suitable aramid fiber, such as Kevlar aramid fiber available from E. I. du Pont de Nemours and Company, or any other suitable material. Optionally, a phaser (described herein) may adjust the phasing to compensate for changes in lengths of the tethers 214-216 and/or between the antenna elements, as the tethers 214-216 longitudinally stretch or shrink.

Figure 3:
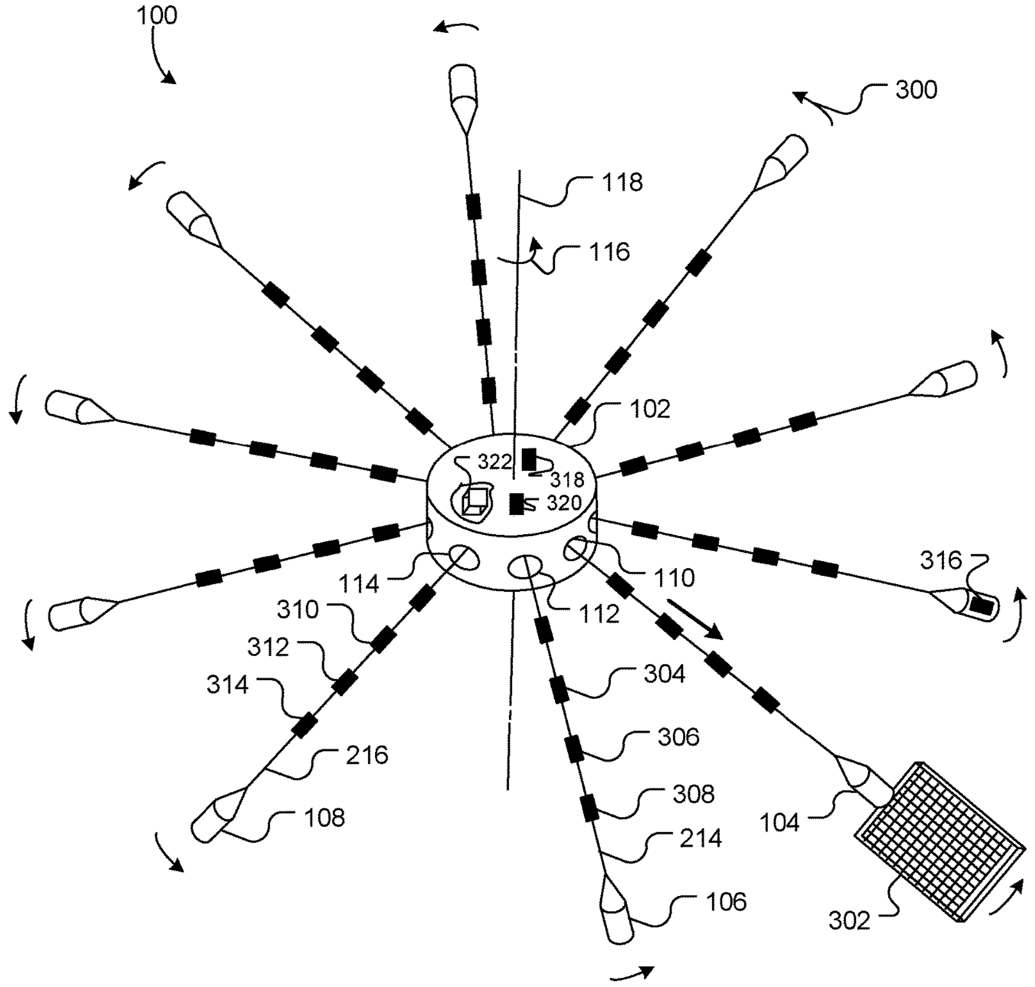
FIG. 3 is a schematic perspective view of the antenna array of FIGS. 1-2, once tethers have been fully payed out and the antenna array is in a fully deployed mode, according to an embodiment of the present invention.

To enter the second (fully deployed) mode, the central satellite 102 pays out the tethers 214-216 from the spools 218-220. FIG. 3 is a schematic perspective view of the antenna array 100, once the tethers 214-216 have been fully payed out and the antenna array 100 is in the second mode. Ends of the tethers 214-216 close to the central satellite 102 ("proximal ends of the tethers 214-216") are mechanically attached to the central satellite 102. Thus, the peripheral satellites 104-108 orbit the central satellite 102, as indicated by arrows, such as arrow 300, at a fixed distance from the central satellite 102. As used herein, "orbit" means to follow a curved path about a point, including a moving point, not necessarily under force of gravity. Thus, the meaning of "orbit" includes following a curved path about a point as a result of being tethered to, or near, the point. In the fully deployed mode, the tethers 214-216 are held taut by the centripetal forces mentioned above.

As used herein with respect to the tethers 214-216, "taut" means under tension. Once the spinning antenna array 100 reaches a steady state, including the peripheral satellites 104-108 reaching stable respective distances from the central satellite 102, the tethers 214-216 are relatively straight along their respective lengths, although the tethers 214-216 may vibrate and may have sharp bends at points where the tethers 214-216 meet the central satellite 102 and/or the peripheral satellites 104-108. Each tether 214-216 has a resonant frequency, and the tethers 214-216 may vibrate at their respective resonant frequencies, such as in response to stimulation by atmospheric drag, solar pressure, jitter in the reaction wheel 200, etc. In addition, the tethers 214-216 may be slightly deformed from a perfectly straight line by atmospheric drag, solar pressure, etc. As used herein with respect to the tethers 214-216, "straight" means extending linearly between the central satellite 102 and a peripheral satellite 104-108, except for possible displacements due to vibrations, bends where the tether 214-216 meets the central satellite 102 or the peripheral satellite 104-108 and slight deformations due to atmospheric drag or solar pressure.

When fully deployed, each tether 214-216 may be as short as about 1 meter to as long as several kilometers. The length of a fully deployed tether 214-216 may be selected, at least in part, based on the wavelength of signals to be received and/or transmitted by the antenna array 100 and/or size and/or number of antenna elements desired to be disposed along each tether 214-216. The length of each tether 214-216 is limited primarily by strength of the tether 214-216 and the orbital speed of the peripheral satellites 104-108 about the central satellite 102.

As the tethers 214-216 are payed out and the peripheral satellites 104-108 are deployed progressively radially further from the central satellite 102, the orbital speeds (angular velocities) of the peripheral satellites 104-108 decrease to conserve angular momentum. The rotation speed (angular velocity) of the central satellite 102 may be decreased, to match the decreased orbital speeds of the peripheral satellites 104-108. Other details of deploying a rotating system of tethered satellites, although in the context of optical interferometers, are described by Ph. Claudin, et al., in "A Concept of Deployable Tethered Interferometer," Proceedings of the ESA Colloquium on Targets for Space-based interferometry, Beauliu, France, Oct. 13-16, 1992, the entire contents of which are hereby incorporated herein, for all purposes. Further details of deploying a rotating system of tethered satellites, although in the context of optical interferometers, such as damping of tether oscillations, are described by Enrico C. Lorenzini in "Participation in the Analysis of the Far-Infrared/Submillimeter Interferometer," Annual Report #1, NASA Grant NNG04GQ21G, for the period 1 Sep. 2004 through 30 Jun. 2005, July 2005, the entire contents of which are hereby incorporated herein, for all purposes.

The antenna array 100 may include other components, such as solar panels, exemplified by solar panel 302. The solar panels 302 may be used to generate electricity to operate components of the antenna array 100, such as motors (not shown) that turn the reaction wheel 208 (FIG. 2) and the spools 218-220, as well as a phaser and transmitters and/or receivers that are described herein. Only one solar panel 302 is shown in FIG. 3. However, additional solar panels may also be disposed on the remaining peripheral satellites 104-108. Total masses disposed at ends of the tethers 214-216 opposite the central satellite 102 should be at least approximately equal, so angular momentums of the radial "arms" of the antenna array 100 are at least approximately equal. Solar panels (not shown) may be disposed on the central satellite 102.

The antenna array 100 may include a suitable navigation, guidance and control system (not shown) to control the reaction wheel 200, thrusters 202-206, etc. to initially orient the central satellite 102 so the axis 118 extends in a desired direction, such as toward a distant transmitting and/or receiving station. Orienting the central satellite 102 so the axis 118 extends in the desired direction may be more easily done before the peripheral satellites are deployed than after they are deployed. Then, periodically or occasionally, the navigation, guidance and control system may make suitable adjustments to the orientation of the antenna array 100 as needed, such as to correct for drift of the antenna array 100 in space. The antenna array 100 may be reoriented toward a different transmitting or receiving station, such as by retracting the tethers 214-216 and then using the reaction wheel 200 and/or thrusters 202-206, etc. to reorient the central satellite 102 toward a new target. Then, the peripheral satellites 104-108 may again be deployed by extending the tethers 214-216.

At least two antenna elements, represented by antenna elements 304, 306, 308, 310, 312 and 314, are disposed on each tether 214-216. Optionally, antenna elements may be disposed on the peripheral satellites 104-108, as exemplified by antenna element 316. Similarly, optionally, antenna elements may be disposed on the central satellite 102, as exemplified by antenna elements 318 and 320. Collectively, all the antenna elements 304-314, 316 and 318-320 on all the tethers 214-216, on the peripheral satellites 104-108 and on the central satellite 102 form a phase antenna array and are collectively referred to herein as a "plurality of antenna elements disposed along the tethers."

As noted, in a phased antenna array, phases of signals deliver to, or received by, the antenna elements are individually controlled to electronically steer the phased array in a desired direction. The central satellite 102 includes a phaser 322 that controls phases of the signals delivered to, or received by, the plurality of antenna elements 304-314, 316 and 318-320.

Figure 4:
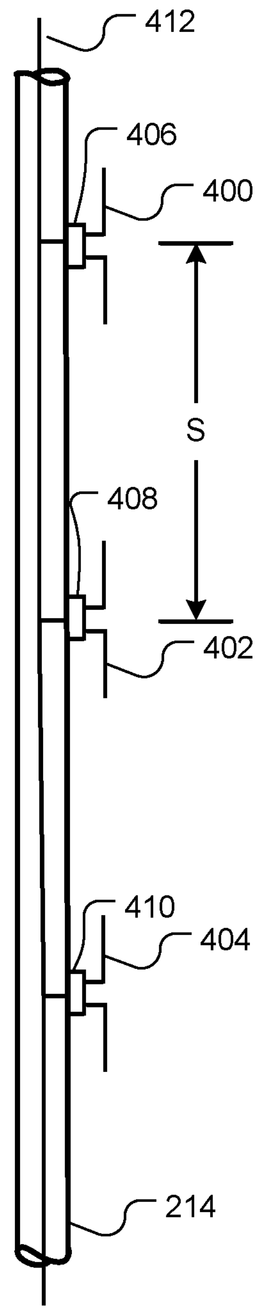
FIG. 4 is a schematic side view of a portion of one tether of FIGS. 2-3, according to an embodiment of the present invention.

FIG. 4 is a schematic side view of a portion of one tether 214, according to an embodiment of the present invention. Three dipole antenna elements 400, 402 and 404, are shown disposed along the portion of the tether 214, although other types of antenna elements may be used and/or other numbers of antenna elements may be disposed on the tether 214. The antenna elements 400 and 402 are separated by a distance S. Other adjacent pairs of antenna elements may be separated by distances S, or some or all other adjacent pairs of antenna elements may be separated by other distances. The separation distance(s) should be taken into account in the design of the phaser 322 (FIG. 3), as would be appreciated by a practitioner skilled in the art of phased antenna arrays.

In the embodiment of FIG. 4, each antenna element 400-404 is communicatively coupled to a transmitter, a receiver or a transceiver, represented by devices 406, 408 and 410. The transmitters, receivers or transceivers 406-410 are coupled to the phaser 322 (FIG. 3), such as via optical fibers, wires, coaxial cables or other suitable cabled or cable-less interconnections, represented by interconnections 412. The phaser 322 sends signals via the interconnections 412 to the transmitters, receivers or transceivers 406-410, and the devices 406-410 use the signals to control phasing of signals the devices 406-410 transmit or receive via the respective antenna elements 400-404.

Figure 5:
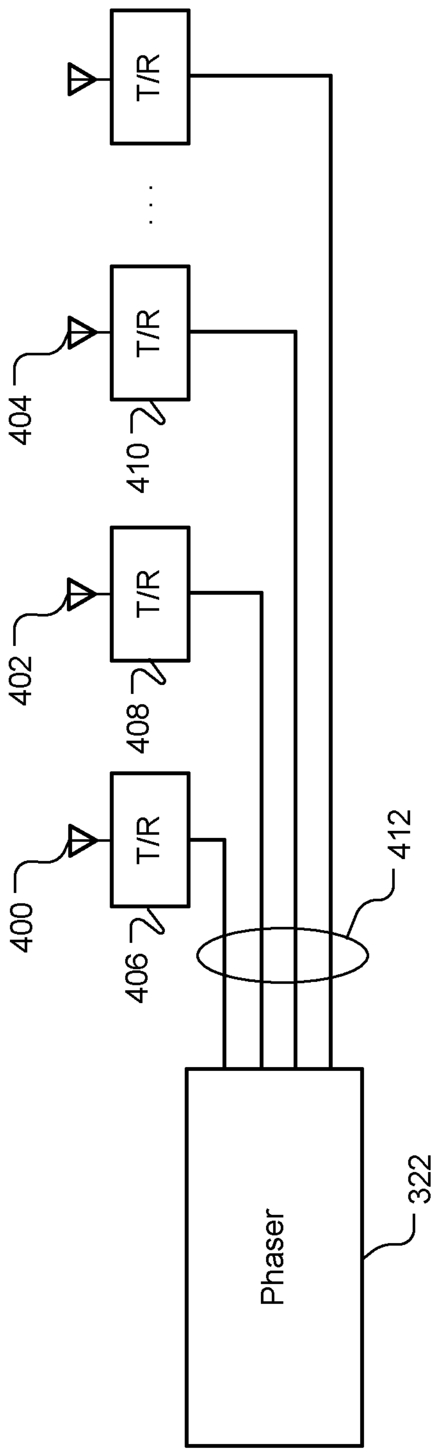
FIG. 5 is a schematic block diagram of a phaser interconnected to antenna elements on one tether of the antenna array of FIGS. 1-4, according to an embodiment of the present invention.

The interconnections 412 may be individual or grouped, i.e., a separate interconnection 412 may extend from the phaser 322 to each transmitter, receiver or transceiver 406-410, as shown schematically if FIG. 5. Alternatively, a separate interconnection 412 may extend from the phaser 322 to each subset of devices 406-410, or a single interconnection 412 may extend from the phaser 322 to the first transmitter, receiver or transceiver 406, and the interconnection 410 may then "daisy-chain" through the first device 406 and each subsequent device 408-410.

In some embodiments, the devices 406-410 are power amplifiers (for transmitting) or low-noise amplifiers (for receiving), and the interconnections 420 carry RF signals to or from the phaser 322 or another circuit, such as a transmitter or a receiver (not shown), between the antenna elements 400-404 and the phaser 322 or following the phaser 322. The phaser 322 may control phasing of the transmitter or receiver. Alternatively, the devices 406-410 merely RF-couple the antenna elements 400-404 to the interconnection(s) 412, without amplification. In these cases, the phaser 322 generates and/or detects RF signals or a suitable transmitter, receiver or transceiver, disposed in the central satellite 102, is coupled to the phaser 322. The interconnection(s) 412 may, but need not, provide or contribute to mechanical strength of the tether 214.

Figure 6:
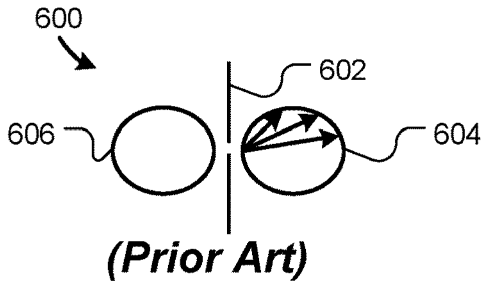
(Prior Art) Fig. 6
FIG. 6 is a two-dimensional radiation pattern (antenna pattern) of a hypothetical dipole antenna, according to the prior art.

FIG. 6 is a two-dimensional radiation pattern (antenna pattern) 600 of a hypothetical dipole antenna 602, as known in the prior art. The radiation pattern indicates strength of a signal radiated by the antenna 602 in various directions or, by the reciprocity theorem, sensitivity of the antenna 602 to signals received from various directions. The strength or sensitivity is indicated by lengths of representative arrows, and the directions are indicated by directions of the representative arrows. The locus of tips of arrow heads of all possible direction arrows, which in this case is two loops 604 and 606, is the radiation pattern. An ideal dipole antenna has a three-dimensional radiation pattern resembling a torus. The two loops 604 and 606 in FIG. 6 represent a cross-sectional view, taken in the plane of the drawing, of such a torus.

Figure 7:
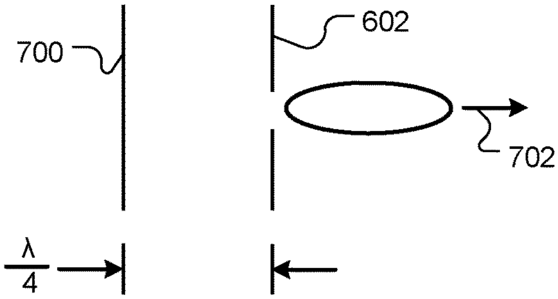
(Prior Art) Fig. 7
FIG. 7 is a two-dimensional radiation pattern (antenna pattern) of a hypothetical dipole antenna, with a reflecting element, according to the prior art.

As shown in FIG. 7, disposing a reflecting antenna element 700 one-quarter wavelength ($\lambda/4$), or any odd integral multiple thereof, from the dipole element 602 reflects signals, thereby effectively folding the torus in half and theoretically doubling the radiation pattern in a direction 702 opposite the reflecting element 700, as known in the prior art. (Only the main lobe of the radiation pattern is shown in FIG. 7. Side lobes are omitted for clarity.)

Figure 8:
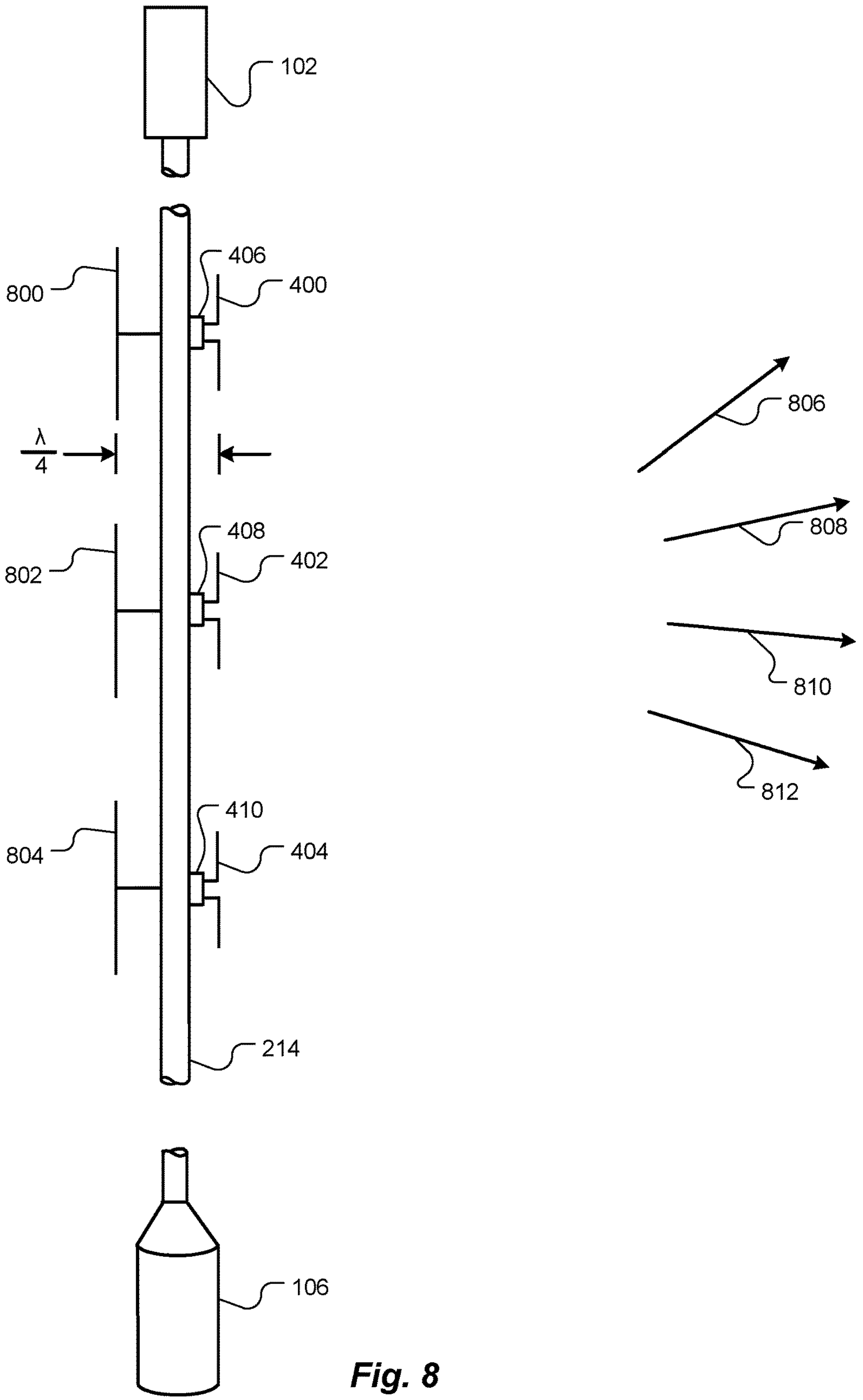
FIG. 8 is a schematic side view of portions of one tether of FIGS. 1-3, according to another embodiment of the present invention.

FIG. 8 is a schematic side view of portions of the tether 214, according to another embodiment of the present invention. Three dipole antenna elements 400-404 are shown disposed along a portion of the tether 214, as in FIG. 4. Other types and/or numbers of antenna elements may be used. A respective reflecting antenna element, represented by reflectors 800, 802 and 804, is disposed one-quarter wavelength, or an odd integral multiple thereof, from each antenna element 400-404 to increase radiation and/or sensitivity of the antenna elements 400-404 on a side opposite the reflectors 800-804. Alternatively, rather than attaching separate reflectors 800-804, the tether 214 may be made of, or coated with, a suitable metallic material that reflects RF signals, and the antenna elements 400-404 may be spaced apart from the tether 214 one-quarter wavelength, or an odd integral multiple thereof.

Figure 9:
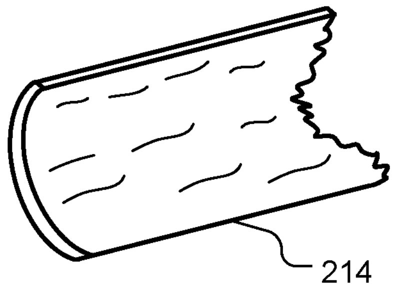
FIG. 9 is a perspective illustration of a portion of one tether of FIG. 8, according to an embodiment of the present invention.

The tether 214 may have another suitable cross-sectional shape, such as circular, ellipsoidal or rectangular. To prevent twisting of the tether 214 about a longitudinal axis thereof, or to restore the tether 214 to an untwisted state, the tether 214 may be made of, or include, a shape-memory material, such as a shape-memory alloy or a shape-memory polymer. Optionally, the tether 214 may have a curved cross-sectional shape, as shown in FIG. 9, similar to the cross-sectional shape of some self-supporting tape measures.

Figure 10:
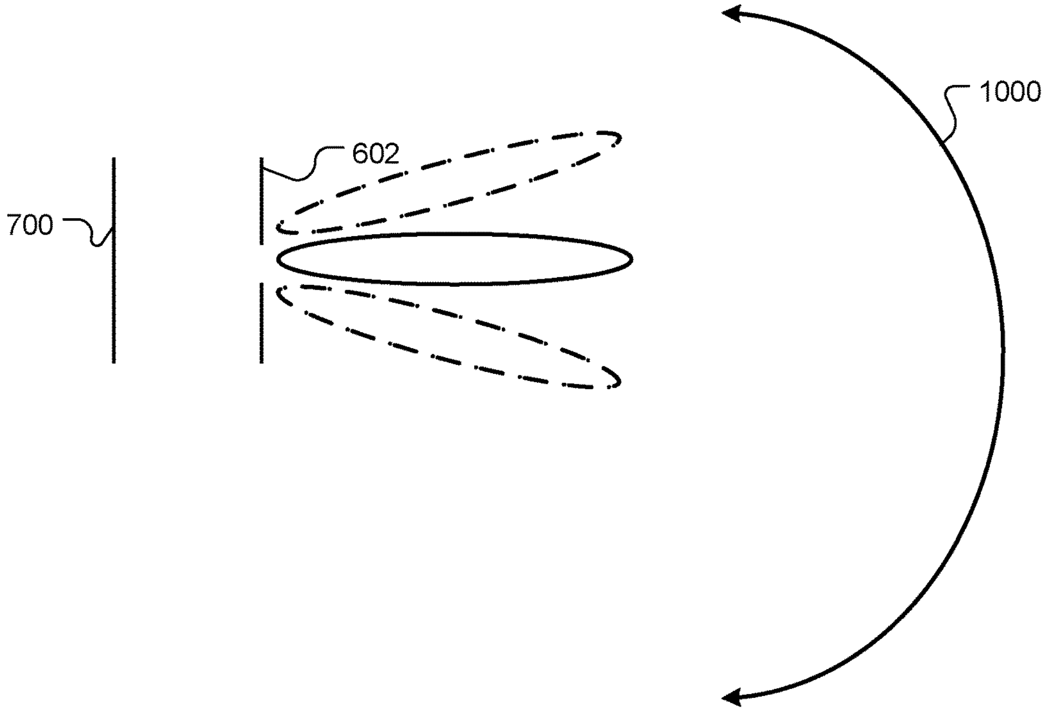
FIG. 10 is a hypothetical two-dimensional radiation pattern of a linear phased array of FIG. 8, according to an embodiment of the present invention.

Returning to FIG. 8, the set of antenna elements 400-404 disposed along the tether 214 forms a linear (one-dimensional) phased array. By adjusting phases of signals sent to, or received from, the antenna elements 400-404, relative to each other, this linear phased array can be electronically steered in one dimension. Exemplary directions in which the linear phased array can be steered are indicated by arrows 806, 808, 810 and 812, all of which are in the plane of the drawing. FIG. 10 is a hypothetical two-dimensional radiation pattern of the linear phased array of FIG. 8. (Only the main lobe of the radiation pattern is shown in FIG. 10. Side lobes are omitted for clarity.) Arrow 1000 indicates an exemplary range over which the linear phased array can be electronically steered.

Figure 11:
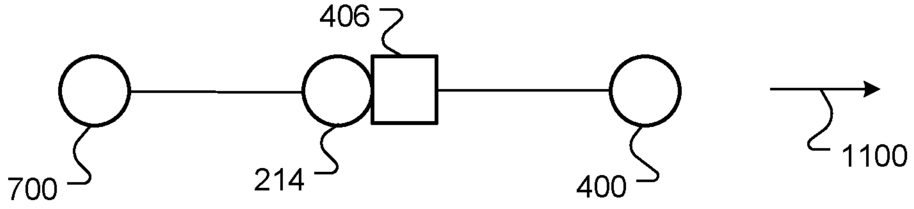
FIG. 11 is a schematic top view of the tether of FIG. 8, according to an embodiment of the present invention.

While FIG. 8 is a schematic side view of portions of the tether 214, FIG. 11 is a schematic top view of the tether 214, i.e., a view from the central satellite 102. Although the linear phased array of antenna elements 400-404 on the tether 214 can be electronically steered within the plane of FIG. 8, as shown in FIG. 11, directionality, indicated by arrow 1100, of the linear phased array of a single tether 214 is fixed and cannot be electronically steered in the plane of FIG. 11.

Figure 12:
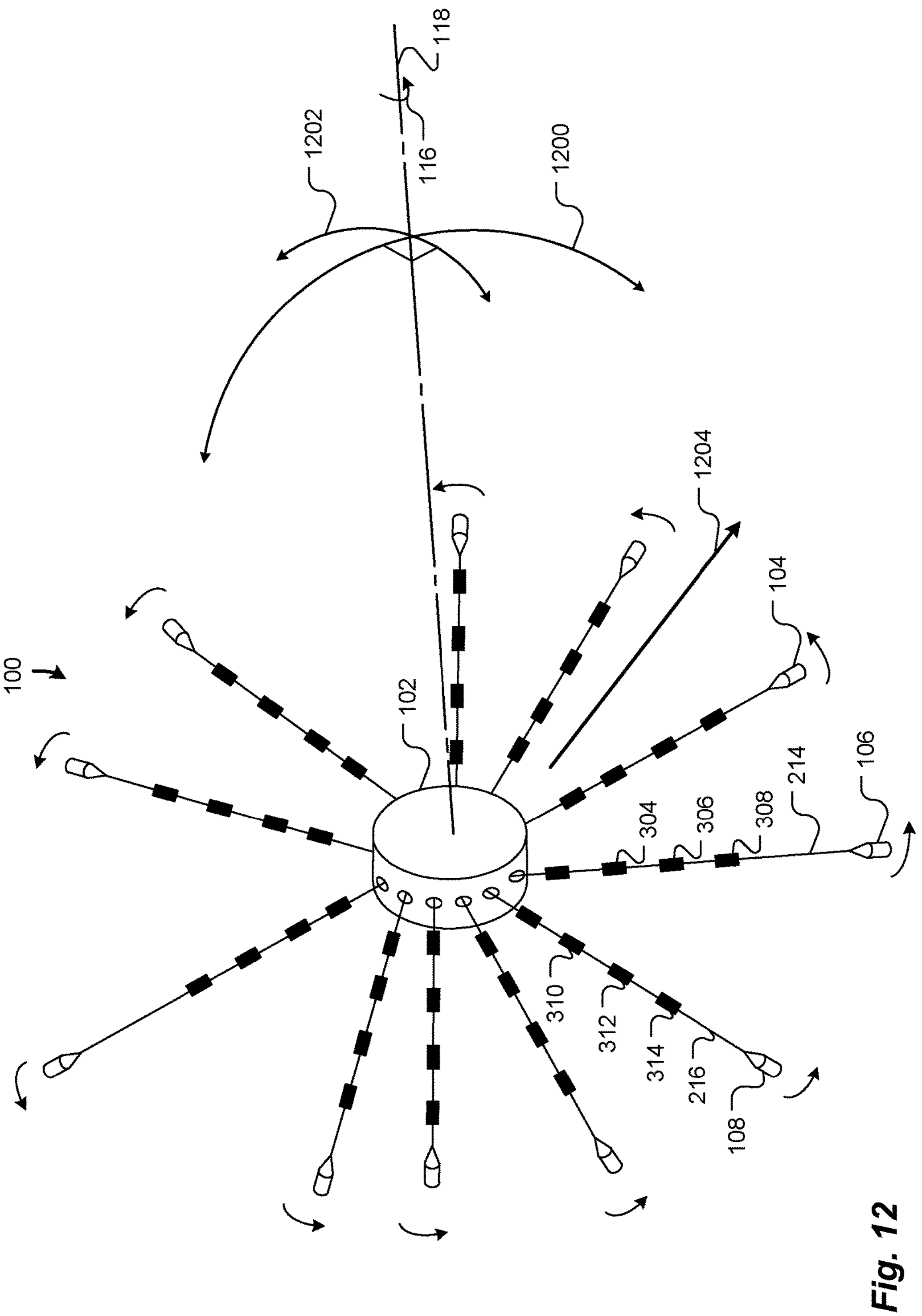
FIG. 12 is a schematic perspective view of the antenna array, fully deployed, of FIGS. 1-3, 8, 10 and 11, according to an embodiment of the present invention.

However, as shown schematically in FIG. 12, with addition of more tethers and their attendant antenna elements, the plurality of antenna elements 304-314, 316 and 318-320 forms a two-dimensional array of antenna elements, which can be electronically steered in two orthogonal dimensions 1200 and 1202. Prior art space-based two-dimensional phased arrays require constellations of disconnected, likely separately launched, satellites, where each satellite includes one linear array of antenna elements, as described by Philip G. Tomlinson, et al., in "Space-Based Tethered Array Radar (STAR)—A Distributed Small Satellite Network," Second Annual AIAA/Utah State University Conference on Small Satellites, Sep. 19-21, 1988, the entire contents of which are hereby incorporated by reference herein, for all purposes.

Ascertaining and maintaining distances among the individual satellites and distributing signals among the disconnected satellites, which are both required to operate a phased array, are difficult in the Tomlinson system. Furthermore, each Tomlinson linear array must be deployed in a gravitation gradient field, such as in orbit around a planet, to maintain its attitude, relative to other linear arrays in the constellation. Thus, Tomlinson's system is not usable for interplanetary space flight or for deployment at Lagrange points.

In contrast, due to tension in the tethers 214-216 created by rotation of the antenna array 100, embodiments of the present invention operate essentially as rigid systems and do not require gravitational fields. Thus, once in the fully deployed mode, distances among the antenna elements 304-314, 316 and 318-320 remain constant, thereby solving the distance problems inherent in the Tomlinson system. Furthermore, all the components of the presently disclosed antenna array are attached together by tethers, facilitating communication via wires or optical fibers between the phaser 322 and the antenna elements 304-314, 316 and 318-320, whereas Tomlinson must use wireless communication, with its attendant power, interference and licensing issues.

Figure 13:
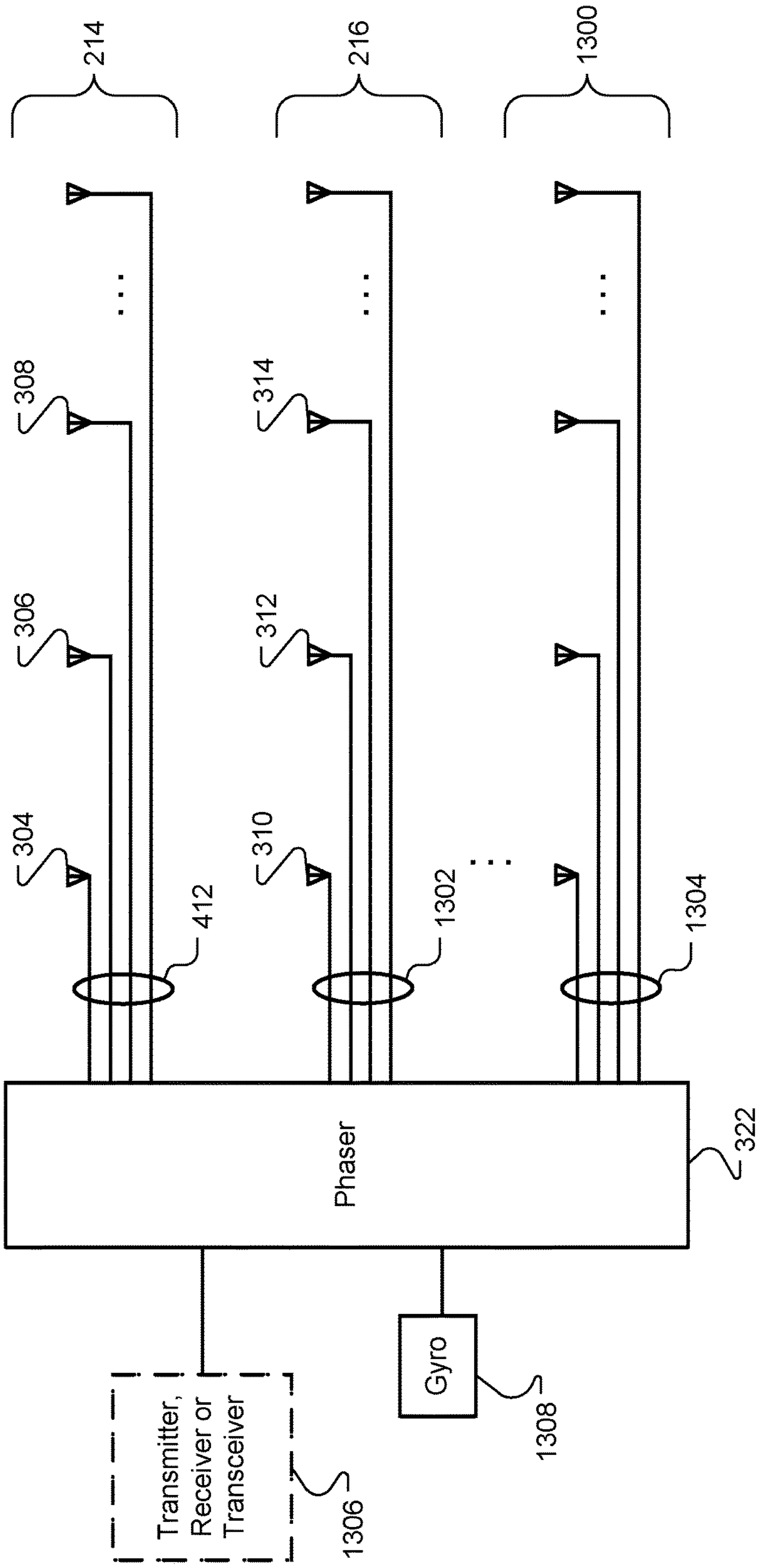
FIGS. 13, 14 and 15 are schematic block diagrams of signal distribution architectures for the antenna array of FIGS. 1-3, 8 and 10-12, according to respective embodiments of the present invention.

FIG. 13 is a schematic diagram illustrating interconnection of the plurality of antenna elements 304-314, 316 and 318-320 on all the tethers 214-216 and 1300 to the phaser 322 via respective interconnections, such as interconnections 412, 1302 and 1304, according to one embodiment. As discussed herein, in other embodiments, other interconnection architectures may be used, such as daisy chains. As shown in FIG. 13, a transmitter, receiver or transceiver 1306 is connected to the phaser 322 to generate or receive RF signals that the phaser 322 then processes, i.e., adjusts phases of, for distribution to the plurality of antenna elements 304-314, 316 and 318-320.

Figure 14:
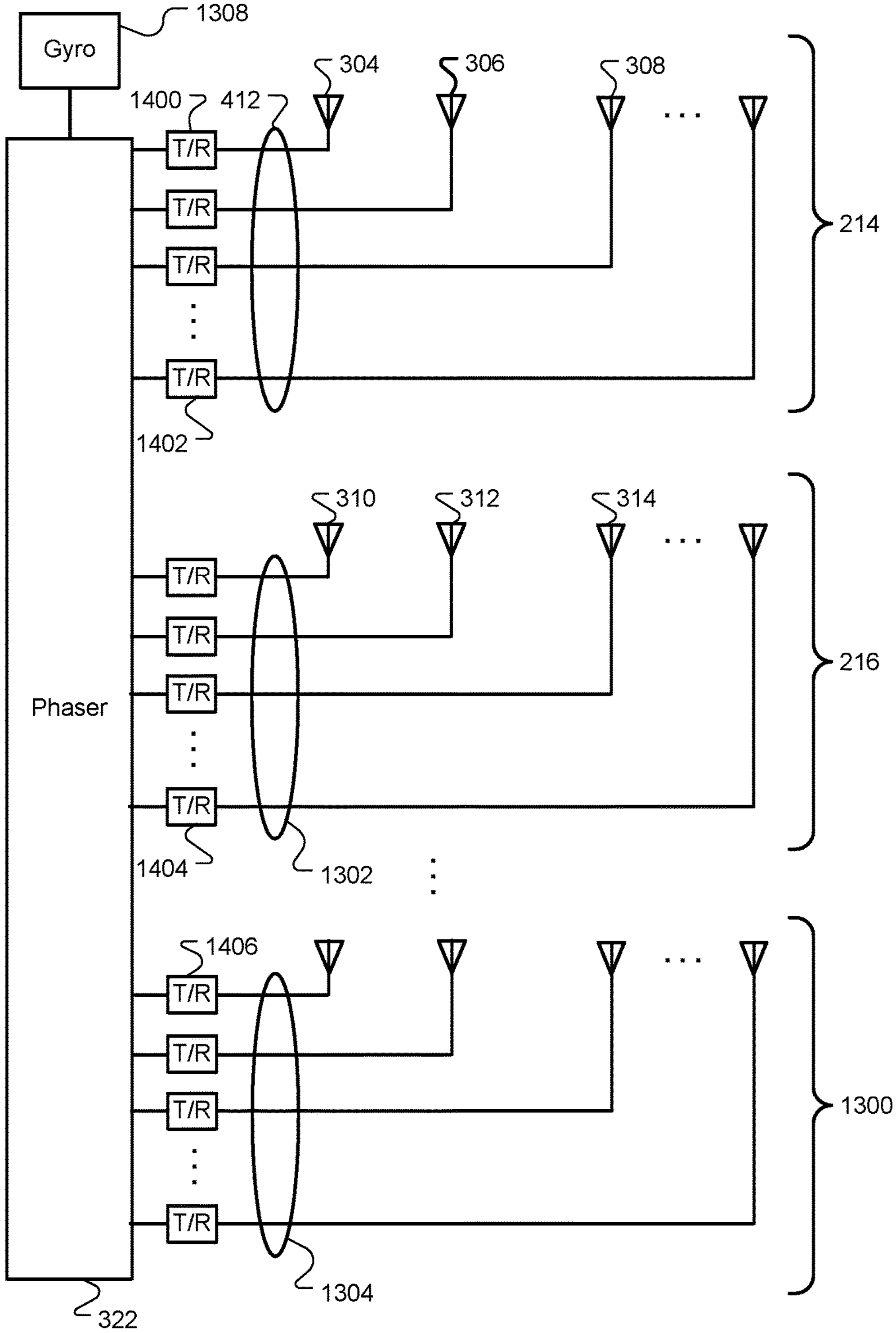
Figure 15:
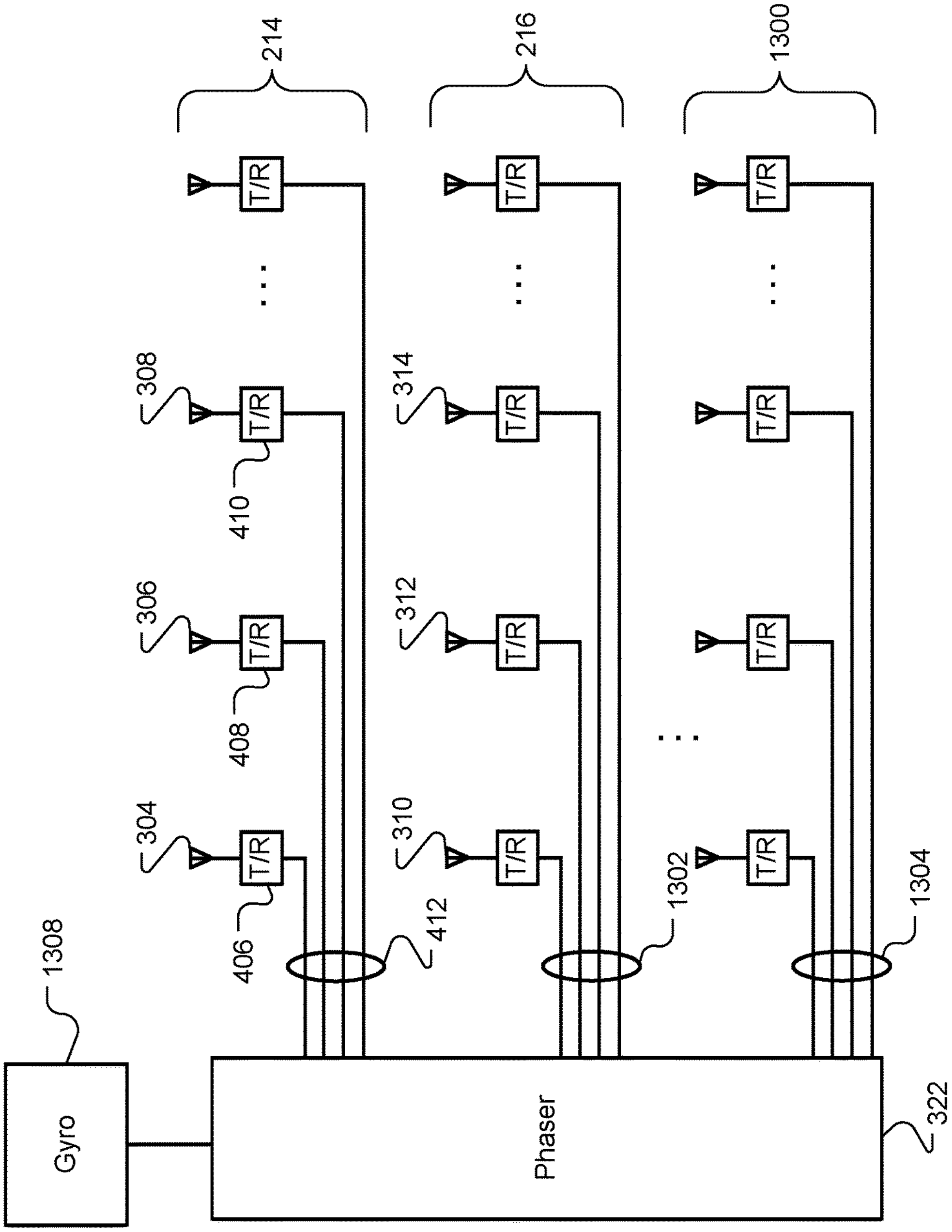

Alternatively, as shown schematically in FIG. 14, the phaser 322 may provide phase control signals to one or more transmitters, receivers or transceivers, exemplified by devices 1400, 1402, 1404 and 1406, and these devices may generate and/or receive RF signals and couple to respective antenna elements 304-314 on the respective tethers 214-216 and 1300. FIG. 15 schematically illustrates yet another architecture, in which the phaser 322 sends phase control signals via the interconnects, represented by interconnect 412, 1302 and 1304, to transmitters, receivers or transceivers, represented by devices 406-410, on the various tethers 214-216 and 1300, and the devices 406-410 RF couple directly to antenna elements 304-314.

Returning to FIG. 12, as the antenna array 100 rotates 116 about the axis 118, the phasing of the plurality of antenna elements 304-314, 316 and 318-320 may need to be changed. For example, if the antenna array 100 is electronically aimed in a direction other than along the axis 118, such as in a direction indicated by arrow 1204, and the antenna array 100 rotates, the phasing of each antenna element 304-314, 316 and 318-320 should be changed in synchrony with the rotation, so as to maintain the antenna array's radiation pattern favoring the direction 1204. The phasing may be altered continuously or in discrete steps, such as every 1° of rotation 116 about the axis 118 or every second in time.

As shown in FIG. 13, a gyro 1308 or other orientation sensor may be coupled to the phaser 322 to provide a signal indicative of orientation of the antenna array 100, i.e., angular position about the axis 118, so the phaser 322 can appropriately alter the phasing of signals sent to, or received from, the plurality of antenna elements 304-314, 316 and 318-320, as the antenna array 100 rotates about the axis 118. As used herein, "gyro" means a sensor that measures orientation (attitude), regardless the physical principle used to implement the gyro. For example, the gyro 1308 may be implemented as one or more accelerometers, spinning wheels in a gimbal mount, solid-state ring lasers, fiber optic gyroscopes (FOGs), hemispherical resonator gyroscopes (HRGs) or any other suitable device. In cases where the gyro 1308 is expected to drift significantly enough to adversely affect accuracy of the phasing, the gyro 1308 may be periodically or occasionally corrected, such as according to data from a GPS receiver, star tracker, earth horizon sensor or sun sensor.

An antenna array 100 as described herein may be used to relay signals between an earth station and another satellite, or between an earth station and a station on the moon or on another planet. Similarly, the antenna array 100 may be used to relay signals between two other satellites, particularly if one of the satellites is proximate the antenna array 100, and the other satellite is far from the antenna array 100. The antenna array 100 may be physically oriented such that the axis 118 is aimed approximately at the distant station, be it on the earth, the moon, another planet or a distant satellite, to send signals to and/or receive signals from the distant station.

Figure 16:
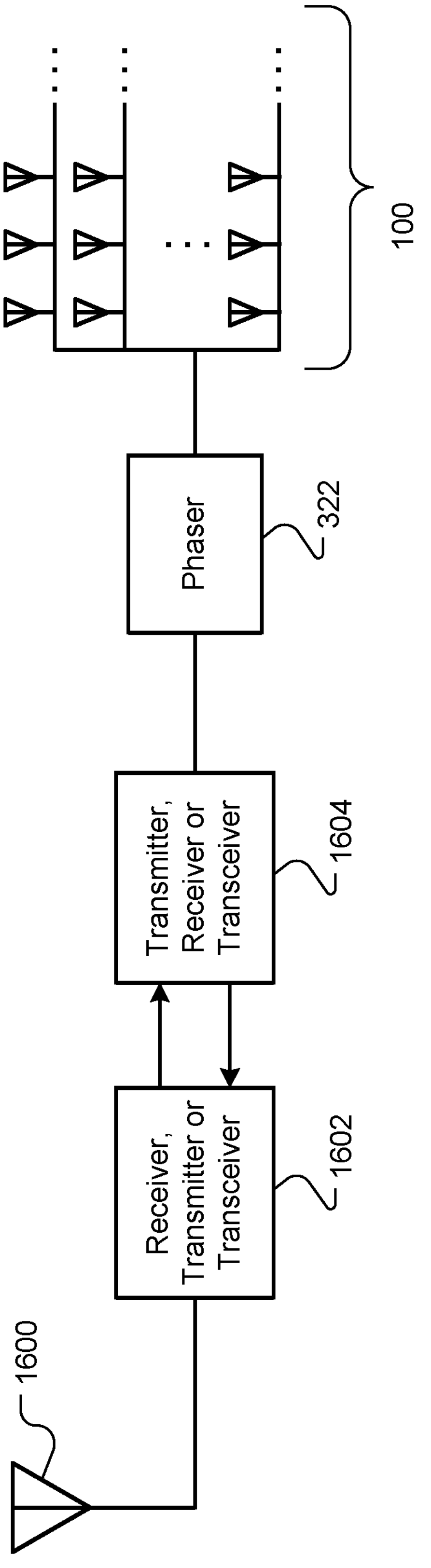
FIG. 16 is a schematic block diagram illustrating a signal relay station configuration of the antenna array of FIGS. 1-3, 8 and 10-15, according to an embodiment of the present invention.

As shown schematically in FIG. 16, a second antenna 1600 may be used to send and/or receive signals to and/or from a local station, such as a station on a planet, about which the antenna array 100 is in orbit, or a companion satellite. A first receiver, transmitter or transceiver 1602 receives and/or transmits signals using the second antenna 1600, and a second transmitter, receiver or transceiver 1604 transmits and/or receives, i.e., relays, the signals using the antenna array 100. The second antenna 1600 may be mounted on the central satellite 102 and/or on one or more of the peripheral satellites 104-108 (FIG. 3). The second antenna 1600 may include antenna elements disposed on some or all of the tethers 214-216 (FIG. 3). The second antenna 1600 may be a phased array antenna.

Optionally, the peripheral satellites 104-108 and their corresponding tethers 214-216 may be drawn back toward the central satellite 102 by the spools 218-220, such as to facilitate re-orienting the axis 118 of the antenna array 100 toward another station or to put the antenna array 100 in a "safe mode" to prevent damage, such as from expected space weather or meteors.

Figure 17:
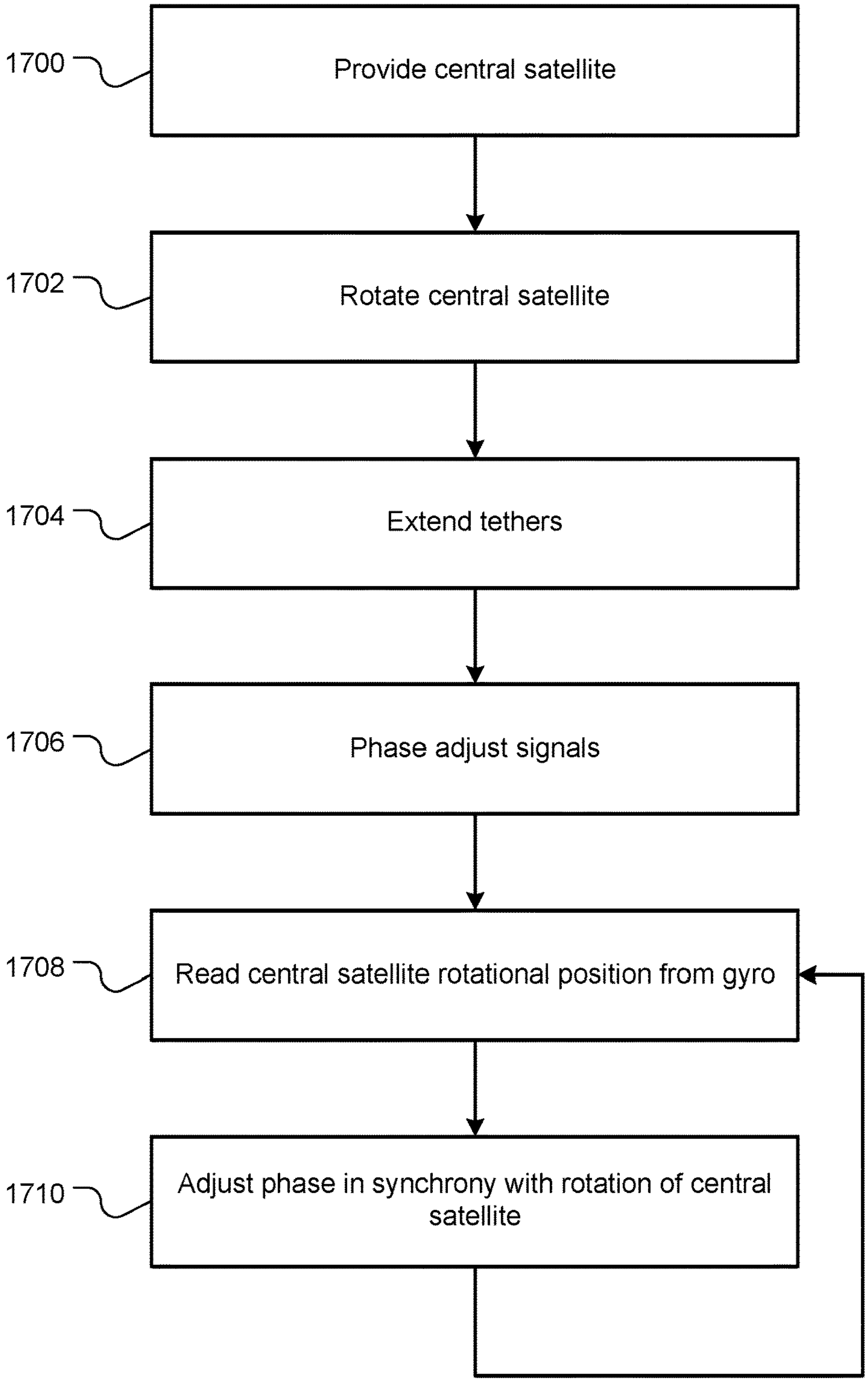
FIGS. 17 and 18 are schematic block diagrams illustrating operations performed, in various combinations, by the antenna array of FIGS. 1-3, 8 and 10-16, according to embodiments of the present invention.

FIG. 17 contains a flowchart that schematically illustrates operations performed, in various combinations, by embodiments of the present invention. At 1700, a central satellite, such as central satellite (central hub) 102, is provided, such as by launching the central satellite into space. The central satellite should be configured for space flight. For example, components and construction of the central satellite should be selected and performed to withstand the vacuum and temperatures expected to be encountered in space during a mission of the central satellite. Alternative embodiments, such as embodiments discussed with respect to FIGS. 20 and 21, may have central hubs with more or fewer structures and/or capabilities than the central satellite 102 described with respect to FIGS. 1-3 and 12. At 1702, the central satellite (central hub) is rotated about its axis, such as the axis 118.

At 1704, at least three flexible tethers, such as tethers 214-216 (FIG. 2), are extended radially from the central satellite using centripetal forces caused by orbiting of the peripheral satellites about the central satellite. The tethers 214-216 may be payed out by the central hub 102, as described with respect to FIGS. 1-3 and 12. Alternatively, as described with respect to FIGS. 20 and 21, the peripheral satellites may pay out the tethers 214-216. All such embodiments and operations are included within the meaning of the phrase "extending a tether from the central hub" and similar phrases, including in the claims.

A respective peripheral satellite, such as peripheral satellites 104-108, is attached to each of the tethers. Extending the tethers thereby deploys the peripheral satellites radially away from the central satellite. The peripheral satellites orbit the center of mass of the antenna array in a plane perpendicular to the axis. The center of mass of the antenna array may or may not be within the central satellite. Each tether is taut between the central satellite and the respective peripheral satellite. Each tether has at least two antenna elements disposed thereon. The antenna elements of all the tethers collectively form an antenna array.

At 1704, signals delivered to, or received from, the antenna array are phase adjusted to beam-steer a lobe of a radiation pattern of the antenna array in two dimensions. At 1708, signals are read from a gyro or other attitude measuring device, such as an inertial navigation system (INS), to ascertain a current rotational position of the central satellite about the axis. At 1710, the phases of the signals delivered to, or received from, the antenna array are adjusted in synchrony with rotation of the central satellite, i.e., to compensate for the current rotational position of the central satellite. Control returns to 1708.

Figure 18:
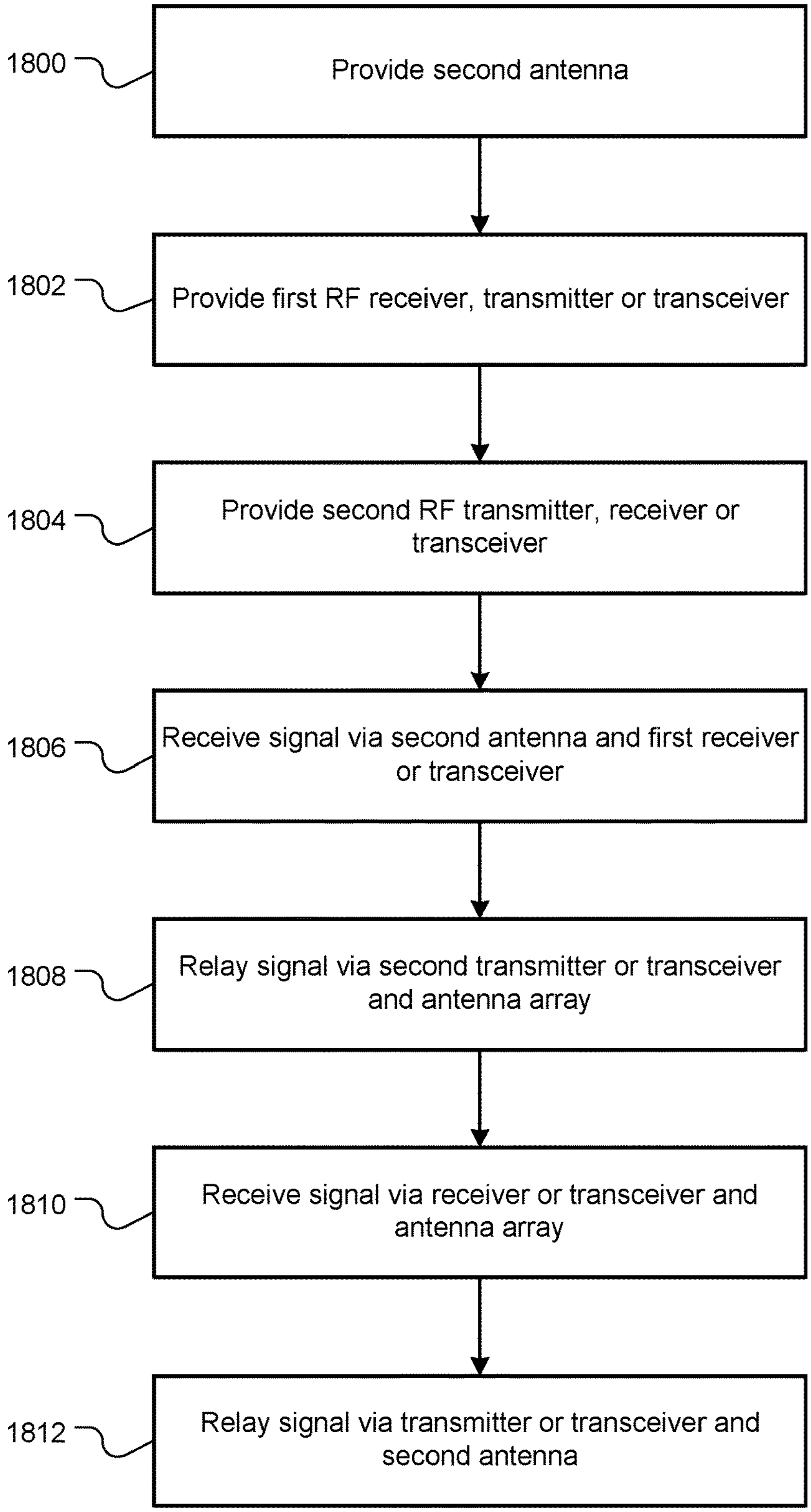

FIG. 18 contains a flowchart that schematically illustrates other operations performed, in various combinations, by embodiments of the present invention to relay signals, such as from a station on a planet or a companion satellite to and/or from earth. At 1800, a second antenna, such as the second antenna 1600 (FIG. 16), is provided. The second antenna is mechanically coupled to the central satellite.

At 1802, a first RF receiver, transmitter or transceiver is provided. The first receiver, transmitter or transceiver is mechanically coupled to the central satellite. If a first receiver or transceiver is provided, an input of the first receiver or transceiver is communicatively coupled to the second antenna to receive RF signals via the second antenna. If a first transmitter or transceiver is provided, an output of the first transmitter or transceiver is communicatively coupled to the second antenna to send RF signals via the second antenna.

At 1804, a second RF receiver, transmitter or transceiver is provided. The second receiver, transmitter or transceiver is mechanically coupled to the central satellite. If a second receiver or transceiver is provided, an input of the second receiver or transceiver is communicatively coupled to the antenna array to receive RF signals via the antenna array, and an output of the second receiver or transceiver is coupled to an input of the first transmitter or transceiver.

If a second transmitter or transceiver is provided, an output of the second transmitter or transceiver is communicatively coupled to the antenna array to send RF signals via the antenna array, and an input of the second transmitter or transceiver is coupled to an output of the first receiver or transceiver.

At 1806, an RF signal is received via the second antenna and the first receiver or transceiver. At 1808, the RF signal is sent by the second transmitter or transceiver via the antenna array, thereby relaying the RF signal, such as from a local satellite or planet-based station to a distant earth.

At 1810, an RF signal is received via the antenna array and the second receiver or transceiver. At 1812, the RF signal is sent by the first transmitter or transceiver via the second antenna, thereby relaying the RF signal, such as from a distant earth to a local satellite or planet-based station.

Figure 19:
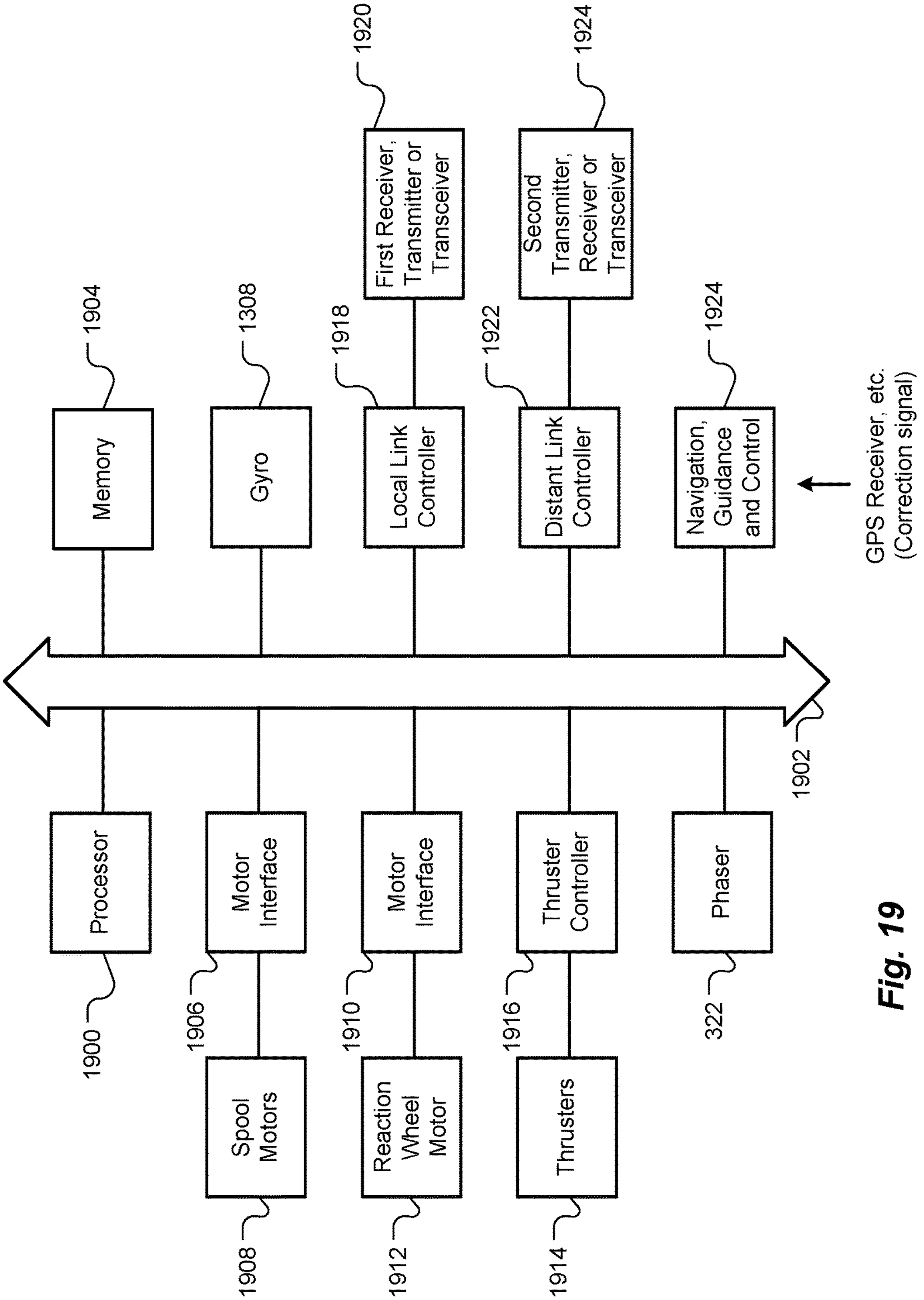
FIG. 19 is a schematic block diagram illustrating components, combinations of which make up various embodiments of the present invention and may perform all or some of the operations and functions described with reference to FIGS. 17 and 18, according to embodiments of the present invention.

Operations and functions described with reference to FIGS. 17 and 18, as well as other operations and functions described herein, may be performed, in whole or in part, by a processor executing instructions stored in a memory. Thus, portions of the antenna array 100 may be implemented by a processor executing instructions stored in a memory. FIG. 19 is a schematic block diagram illustrating components, combinations of which make up various embodiments of the present invention and may perform all or some of the operations and functions described with reference to FIGS. 17 and 18.

A processor 1900 is coupled via a bus 1902 to a memory 1904. The memory 1904 stores instructions, and the processor 1900 fetches and executes the instructions to perform functions and operations described herein. The memory 1904 also stores read-only data, such as tables, and read-write data, such as calculated phase relationships, as needed by the processor 1900.

A motor interface 1906 interconnects the bus 1902, and therefore the processor 1900 and the memory 1904, to spool motors 1908 that drive the spools 218-220 (FIG. 2). The processor 1900 controls the spool motors 1908, such as to pay out or retract the tethers 214-216. Similarly, if the antenna array 100 is equipped with a reaction wheel, a second motor interface 1910 interconnects the bus 1902 to a reaction wheel motor 1912. The processor 1900 controls the reaction wheel motor 1912 to start and stop rotation 116 of the central satellite 102, to control rotational speed of the central satellite 102 and optionally to control attitude of the central satellite 102. Some embodiments include more than one mutually-orthogonally oriented reaction wheel, as known in the art.

If the antenna array 100 is equipped with thrusters 1914, a thruster controller 1916 interconnects the bus 1902 with the thrusters 1914. The processor 1900 controls the thrusters 1914 to start and stop rotation 116 of the central satellite 102, as well as to control rotational speed and/or orientation of the central satellite 102.

The phaser 322 is connected to the bus 1902. The processor 1900 controls the phaser 322, such as to specify phasing of signals received from, or sent to, the plurality of antenna elements 304-314, 316 and 318-320 to electronically steer the antenna array 100. The gyro or other suitable sensor 1308 is coupled to the bus 1902 to provide the processor 1900 with a signal indicating the real-time or near real-time rotational position of the central satellite 102. In some embodiments, the processor polls or otherwise queries the gyro 1308.

In embodiments where the antenna array 100 relays signals, as discussed with respect to FIG. 18, a local link controller 1918 is coupled between the bus 1902 and the first receiver, transmitter or transceiver 1920. In addition, a distant link controller 1922 is coupled between the bus 1902 and the second transmitter, receiver or transceiver 1924.

A suitable navigation, guidance and control 1926 may be coupled to the bus 1902 to communicate with the processor 1900. The navigation, guidance and control 1926 may receive correction signals, as needed, from an external system, such as a global positioning system (GPS) receiver, star tracker, earth horizon sensor or sun sensor.

Figure 20:
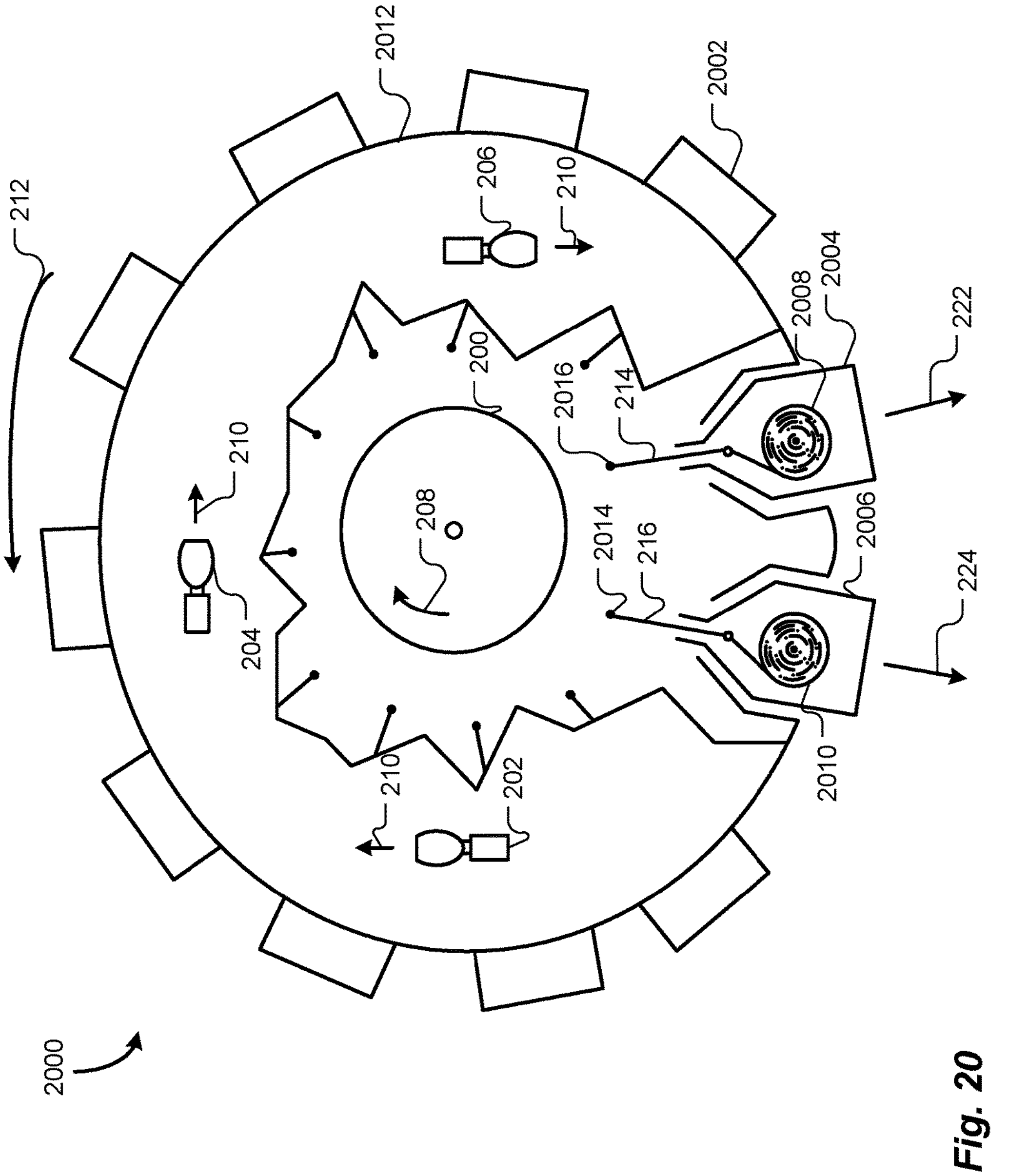
FIG. 20 is a schematic cut-away top view of an antenna array, similar to the antenna array of FIG. 1, but according to an alternative embodiment of the present invention.

FIG. 20 is a schematic cut-away top view of an antenna array 2000, similar to the antenna array 100 of FIG. 1, but according to an alternative embodiment. While in the antenna array 100, the central satellite 102 pays out and retracts the tethers 214-216, in the antenna array 2000, peripheral satellites pay out and retract the tethers. Each peripheral satellite, represented by peripheral satellites 2002, 2004 and 2006, includes a respective spool, represented by spools 2008 and 2010. Each spool 208-2010 is driven by a respective motor (not shown). Distal ends of the tethers 214-216 are wound on the spools 2004-2006, and proximal ends of the tethers 214-216 are attached to the central satellite 2012 at respective anchors, represented by anchors 2014 and 2016. In other respects, the antenna array 2000 is structured and operates like the other antenna arrays described herein.

Figure 21:
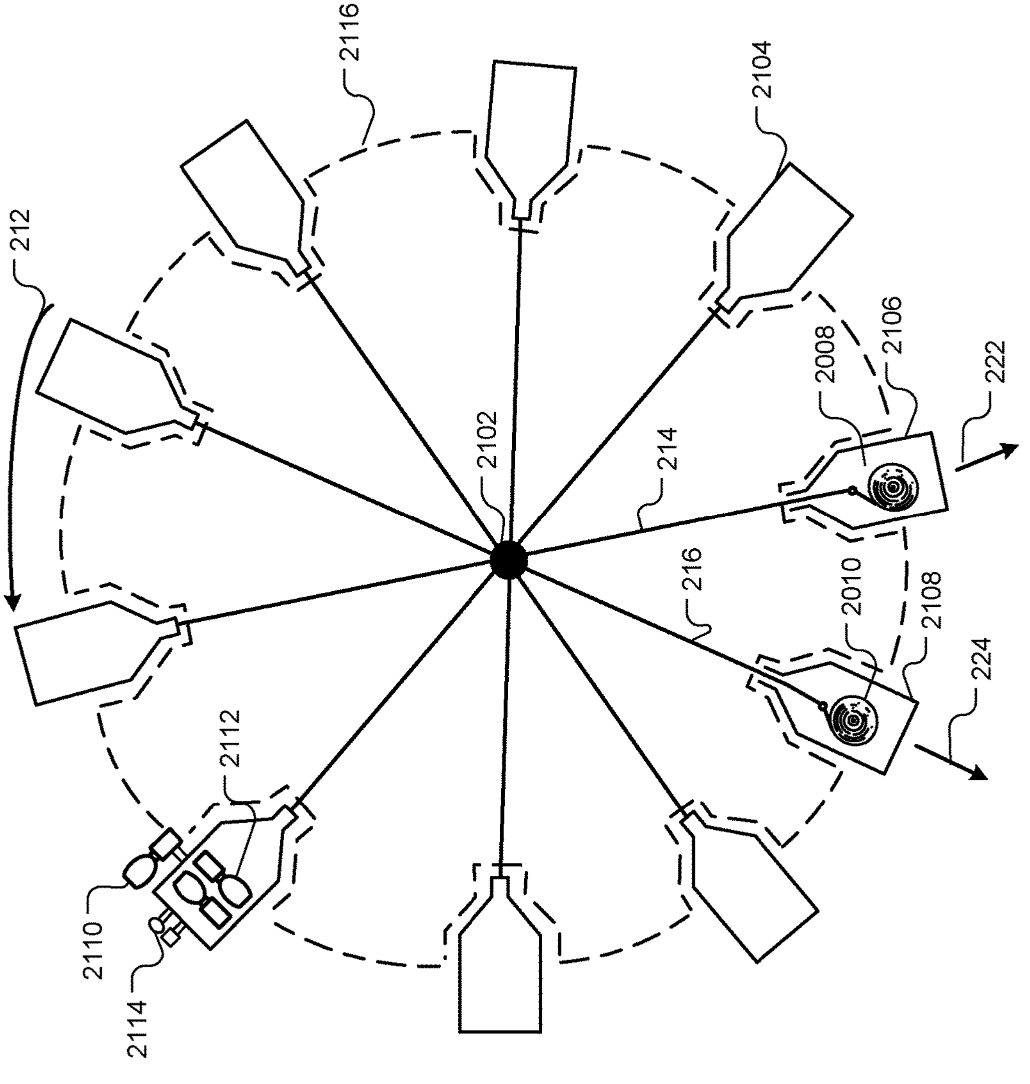
FIG. 21 is a schematic top view of an antenna array, similar to the antenna array of FIG. 20, according to another alternative embodiment of the present invention.

FIG. 21 is a schematic top view of an antenna array 2100, similar to the antenna array 2000 of FIG. 20, but according to another alternative embodiment. While the antenna array 2000 includes a central satellite 2012, the antenna array 2100 does not include a central satellite. Instead, proximal ends of the tethers 214-216 are bound together by a suitable clamp 2102 where a central satellite would be located. The clamp 2102 forms a central hub.

In addition, each peripheral satellite, represented by peripheral satellites 2104, 2106 and 2108, includes thrusters, represented by thrusters 2110, 2112 and 2114. Each peripheral satellite 2104-2108 uses its respective thrusters 2110-2114 to urge itself away from the clamp (central hub) 2102 while paying out its respective tether 214-216 and to initiate, change or stop the rotation 212 of the antenna array 2100. In addition, the peripheral satellites 2104-2108 collectively use the thrusters 2110-2114 to reposition themselves relative to each other and to reorient the antenna array 2100, without necessarily retracting the tethers 214-216. In other words, each peripheral satellite 2104-2108 may fly to a new position, thereby reorienting the entire antenna array 2100.

The peripheral satellites 2104-2108 may be initially held together, such as during launch and ejection from a launch vehicle, by a frame or bracket 2116, as indicated by dashed line. The frame or bracket 2116 may include a reaction wheel and/or thrusters (not shown) to initially position and/or spin 212 the antenna array 2100, before the tethers 214-216 are extended. The frame or bracket 2116 may be deorbited after the peripheral satellites 2104-2108 deploy, i.e., after the tethers 214-216 are initially extended. In other respects, the antenna array 2100 is structured and operates like the other antenna arrays described herein.

Figure 22:
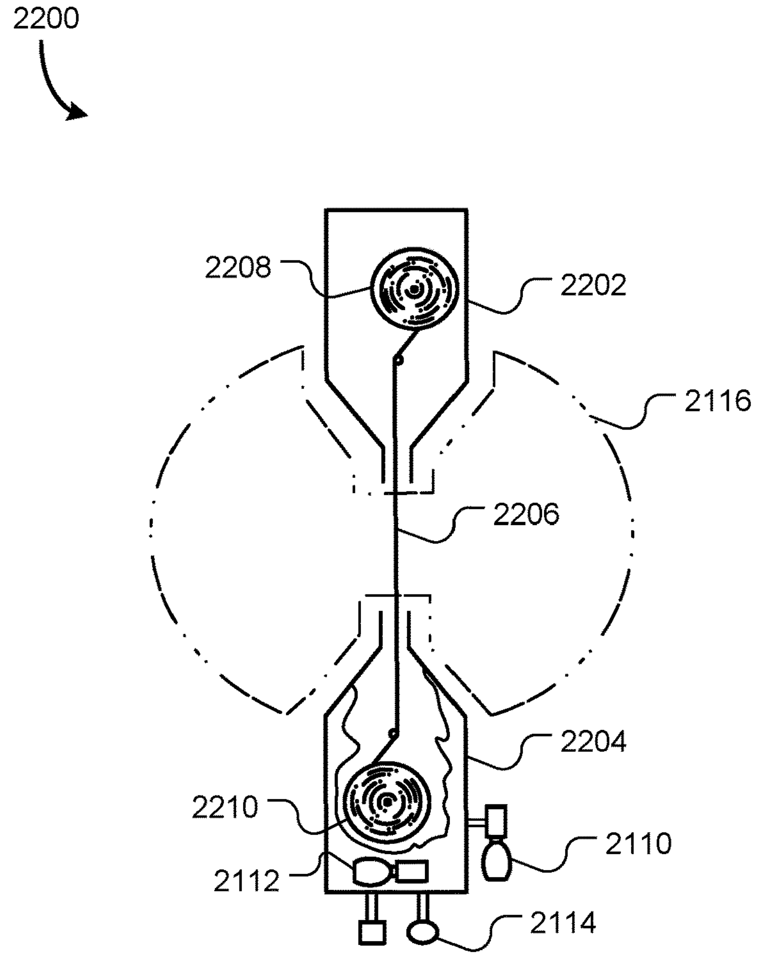
FIG. 22 is a schematic top view of a linear antenna array that includes two peripheral satellites connected to each other by a tether, according to yet another embodiment of the present invention.

Some embodiments include only two peripheral satellites, thereby forming a linear (one dimensional) antenna array. FIG. 22 is a schematic top view of a linear antenna array 2200 that includes two peripheral satellites 2202 and 2204 connected to each other by a tether 2206. Such a linear antenna array 2200 is beam steerable in one dimension, as discussed with respect to FIG. 10. One or both of the peripheral satellites 2202 and 2204 include a spool, represented by spools 2208 and 2210. The peripheral satellites 2202-2204 may be initially held together, such as during launch and ejection from a launch vehicle, by a frame or bracket 2116, as discussed with respect to the antenna array 2100 of FIG. 21. In other respects, the antenna array 2200 is structured and operates like the other antenna arrays described herein.

Although aspects of embodiments may be described with reference to flowcharts and/or block diagrams, functions, operations, decisions, etc. of all or a portion of each block, or a combination of blocks, may be combined, separated into separate operations or performed in other orders. All or a portion of each block, or a combination of blocks, may be implemented as computer program instructions (such as software), hardware (such as combinatorial logic, Application Specific Integrated Circuits (ASICs), Field-Programmable Gate Arrays (FPGAs) or other hardware), firmware or combinations thereof. Embodiments may be implemented by a processor executing, or controlled by, instructions stored in a memory. The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks.

As used herein, outer space (or simply space) means at least 100 km (62 mi.) above earth sea level. While specific parameter values may be recited in relation to disclosed embodiments, within the scope of the invention, the values of all of parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

While the invention is described through the above-described exemplary embodiments, modifications to, and variations of, the illustrated embodiments may be made without departing from the inventive concepts disclosed herein. Furthermore, disclosed aspects, or portions thereof, may be combined in ways not listed above and/or not explicitly claimed. Embodiments disclosed herein may be suitably practiced, absent any element that is not specifically disclosed herein. Accordingly, the invention should not be viewed as being limited to the disclosed embodiments.

What is claimed is:

1. An antenna array, comprising:

a central hub;

at least three flexible extendible tethers attached to the central hub;

at least three peripheral satellites, each peripheral satellite being attached to the central hub by a respective associated one of the tethers; wherein:

the antenna array has a first mode and a second mode;

in the first mode, each tether is retracted, such that the peripheral satellite associated therewith is disposed within 2 meters of the central hub; and in the second mode, the central hub is configured to rotate about an axis and the tethers are extended, thereby deploying the peripheral satellites radially away from the central hub a distance greater than 2 meters, such that the peripheral satellites orbit the central hub in a plane perpendicular to the axis and each tether is taut;

the antenna array further comprising:

a plurality of antenna elements disposed along the tethers, such that at least two antenna elements are disposed along each tether; and a phaser coupled to the plurality of antenna elements and configured to beam-steer a lobe of a radiation pattern of the plurality of antenna elements in two dimensions.

2. An antenna array according to claim 1, wherein, in the second mode, centripetal forces, caused by orbiting of the peripheral satellites about the central hub, extend and tension the tethers.

3. An antenna array according to claim 1, wherein the phaser is configured to alter phasing of the plurality of antenna elements in synchrony with rotation of the central hub.

4. An antenna array according to claim 1, further comprising:

a second antenna;

a radio-frequency receiver having an input coupled to the second antenna and having an output; and a radio-frequency transmitter having an input coupled to the output of the receiver and having an output coupled to the phaser, wherein the receiver is configured to receive signals via the second antenna and the transmitter is configured to relay the signals via the plurality of antenna elements.

5. An antenna array according to claim 1, further comprising:

a second antenna; and a radio-frequency transceiver coupled to the second antenna and to the phaser, wherein the transceiver is configured to receive first signals via the second antenna and relay the first signals via the plurality of antenna elements.

6. An antenna array according to claim 5, wherein the transceiver is further configured to receive second signals via the plurality of antenna elements and relay the second signals via the second antenna.

7. An antenna array according to claim 1, wherein the central hub comprises at least one spool configured to extend the at least three tethers.

8. An antenna array according to claim 1, wherein each peripheral satellite comprises a respective spool configured to extend the tether associated with the peripheral satellite.

9. An antenna array according to claim 1, wherein each tether comprises a respective optical fiber communicably coupled between the phaser and the at least two antenna elements disposed along the tether.

10. An antenna array, comprising:

a central hub configured to rotate about an axis;

at least three tethers attached to the central hub and configured to extend radially away from the central hub;

at least three peripheral satellites, wherein each peripheral satellite is: (a) attached to the central hub by a respective one of the tethers, (b) configured to be spaced apart from the central hub and tension the respective one of the tethers and (c) configured to orbit the central hub in a plane perpendicular to the axis;

a plurality of antenna elements disposed along the tethers, such that at least two antenna elements of the plurality of antenna elements are disposed along each tether; and a phaser coupled to the plurality of antenna elements and configured to beam-steer a lobe of a radiation pattern of the plurality of antenna elements in two dimensions.

11. An antenna array according to claim 10, wherein centripetal forces, caused by orbiting of the peripheral satellites about the central hub, extend and tension the tethers.

12. An antenna array according to claim 10, wherein the phaser is configured to alter phasing of the plurality of antenna elements in synchrony with rotation of the central hub.

13. An antenna array according to claim 10, further comprising:

a second antenna;

a radio-frequency receiver having an input coupled to the second antenna and having an output; and a radio-frequency transmitter having an input coupled to the output of the receiver and having an output coupled to the phaser, wherein the receiver is configured to receive signals via the second antenna and the transmitter is configured to relay the signals via the plurality of antenna elements.

14. An antenna array according to claim 10, further comprising:

a second antenna; and a radio-frequency transceiver coupled to the second antenna and to the phaser, wherein the transceiver is configured to receive first signals via the second antenna and relay the first signals via the plurality of antenna elements.

15. An antenna array according to claim 14, wherein the transceiver is further configured to receive second signals via the plurality of antenna elements and relay the second signals via the second antenna.

16. A method for receiving or transmitting radio-frequency signals in outer space, the method comprising:

providing a central hub in outer space;

rotating the central hub about an axis;

extending at least three flexible tethers radially from the central hub, a respective peripheral satellite being attached to each of the tethers, thereby deploying the peripheral satellites radially away from the central hub, such that the peripheral satellites orbit the central hub in a plane perpendicular to the axis and each tether is taut between the central hub and the respective peripheral satellite, each tether having at least two antenna elements disposed thereon, the antenna elements of all the tethers collectively forming an antenna array; and automatically phase adjusting signals delivered to or received from the antenna array to beam-steer a lobe of a radiation pattern of the antenna array in two dimensions.

17. A method according to claim 16, wherein extending the at least three flexible tethers radially from the central hub comprises using centripetal forces, caused by orbiting of the peripheral satellites about the central hub, to extend and tension the tethers.

18. A method according to claim 16, further comprising altering automatically phasing of the plurality of antenna elements in synchrony with rotation of the central satellite.

19. A method according to claim 16, further comprising:

providing a second antenna mechanically coupled to the central hub;

providing a radio-frequency receiver mechanically coupled to the central hub, an input of the receiver being communicatively coupled to the second antenna;

providing a radio-frequency transmitter mechanically coupled to the central hub, an input of the transmitter being communicatively coupled to an output of the receiver and an output of the transmitter being communicatively coupled to the antenna array;

receiving a signal via the second antenna and the receiver; and relaying the signal via the transmitter and the antenna array.

20. A method according to claim 16, further comprising:

providing a second antenna mechanically coupled to the central hub;

providing a radio-frequency transceiver mechanically coupled to the central hub and communicatively coupled to the second antenna and to the antenna array;

receiving first signals via the second antenna and the transceiver; and relaying the first signals via the transceiver and the antenna array.

21. A method according to claim 20, further comprising:

receiving second signals via the antenna array and the transceiver; and relaying the second signal via the transceiver and the second antenna.

22. A method according to claim 20, wherein extending the at least three flexible tethers comprises paying out the at least three flexible tethers from the central hub.

23. A method according to claim 20, wherein extending the at least three tethers comprises, for each of the at least three tethers, paying out a respective one of the at least three flexible tethers from the peripheral satellite attached to the tether.

24. A non-transitory computer-readable medium encoded with instructions that, when executed by a processor, establish processes for performing a computer-implemented method of receiving radio-frequency signals in outer space, the processes comprising:

a process configured to rotate a central hub about an axis;

a process configured to extend at least three flexible tethers radially from the central hub, a respective peripheral satellite being attached to each of the tethers, thereby deploying the peripheral satellites radially away from the central hub, such that the peripheral satellites orbit the central hub in a plane perpendicular to the axis and each tether is taut between the central hub and the respective peripheral satellite, each tether having at least two antenna elements disposed thereon, the antenna elements of all the tethers collectively forming an antenna array; and a process configured to automatically phase adjust signals delivered to or received from the antenna array to beam-steer a lobe of a radiation pattern of the antenna array in two dimensions.

25. A non-transitory computer-readable medium according to claim 24, wherein the process configured to extend the tethers is configured to extend and tension the tethers using centripetal forces caused by orbiting of the peripheral satellites about the central hub.

26. A non-transitory computer-readable medium according to claim 24, the processes further comprising a process configured to automatically alter phasing of the plurality of antenna elements in synchrony with rotation of the central hub.

27. A non-transitory computer-readable medium according to claim 24, wherein:

a second antenna is mechanically coupled to the central hub;

a radio-frequency receiver is mechanically coupled to the central hub, an input of the receiver is communicatively coupled to the second antenna;

a radio-frequency transmitter is mechanically coupled to the central hub, an input of the transmitter is communicatively coupled to an output of the receiver and an output of the transmitter is communicatively coupled to the antenna array; the processes further comprising:

a process configured to receive a signal via the second antenna and the receiver; and a process configured to relay the signal via the transmitter and the antenna array.

28. A non-transitory computer-readable medium according to claim 24, wherein:

a second antenna is mechanically coupled to the central hub; and a radio-frequency transceiver is mechanically coupled to the central hub and communicatively coupled to the second antenna and to the antenna array; the processes further comprising:

a process configured to receive first signals via the second antenna and the transceiver; and a process configured to relay the first signals via the transceiver and the antenna array.

29. A non-transitory computer-readable medium according to claim 28, the processes further comprising:

a process configured to receive second signals via the antenna array and the transceiver; and a process configured to relay the second signal via the transceiver and the second antenna.

* * * * *